(12) United States Patent
Kaizu

(10) Patent No.: US 12,096,137 B2
(45) Date of Patent: *Sep. 17, 2024

(54) SIGNAL PROCESSING DEVICE, SIGNAL PROCESSING METHOD, AND DETECTION SENSOR

(71) Applicant: SONY GROUP CORPORATION, Tokyo (JP)

(72) Inventor: Shun Kaizu, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/769,157

(22) PCT Filed: Nov. 18, 2020

(86) PCT No.: PCT/JP2020/042908
§ 371 (c)(1),
(2) Date: Apr. 14, 2022

(87) PCT Pub. No.: WO2021/111873
PCT Pub. Date: Jun. 10, 2021

(65) Prior Publication Data
US 2024/0114255 A1 Apr. 4, 2024

(30) Foreign Application Priority Data
Dec. 2, 2019 (JP) .................. 2019-218055

(51) Int. Cl.
*H04N 25/47* (2023.01)
*H04N 23/74* (2023.01)
*H04N 23/745* (2023.01)

(52) U.S. Cl.
CPC ............. *H04N 25/47* (2023.01); *H04N 23/74* (2023.01); *H04N 23/745* (2023.01)

(58) Field of Classification Search
CPC ...... H04N 25/47; H04N 23/74; H04N 23/745; H04N 25/707
(Continued)

(56) References Cited

U.S. PATENT DOCUMENTS
2020/0404164 A1* 12/2020 Wu .................. H04N 23/74

FOREIGN PATENT DOCUMENTS
CN 1009842767 * 6/2019 ........... H04N 25/702
CN 111919434 * 11/2020 ............. H04N 25/40
(Continued)

OTHER PUBLICATIONS

Li et al., A 132 by 104 10 μm-Pixel 250 μW 1kefps Dynamic Vision Sensor with Pixel-Parallel Noise and Spatial Redundancy Suppression, 2019 Symposium on VLSI Circuits, Jun. 9-14, 2019, pp. 1-4, Kyoto Japan.

*Primary Examiner* — Lin Ye
*Assistant Examiner* — Chan T Nguyen
(74) *Attorney, Agent, or Firm* — Paratus Law Group, PLLC

(57) ABSTRACT

There is provided a signal processing device, a signal processing method, and a detection sensor that makes it possible to detect flicker information from an output indicating a luminance change. The signal processing device includes: a change detection unit that detects a first luminance change in a positive direction and a second luminance change in a negative direction among luminance changes detected by a light receiving unit; a coefficient generation unit that generates a coefficient depending on a time at which the luminance change is detected; and an integration unit that integrates a result of multiplication of the first luminance change and the coefficient and integrates a result of multiplication of the second luminance change and the
(Continued)

coefficient. The present technology can be applied to, for example, an event detection sensor and the like.

15 Claims, 19 Drawing Sheets

(58) Field of Classification Search
USPC ..................................................... 348/226.1
See application file for complete search history.

(56) References Cited

FOREIGN PATENT DOCUMENTS

| | | | |
|---|---|---|---|
| JP | 2004-007402 | A | 1/2004 |
| JP | 2017-535999 | A | 11/2017 |
| JP | 2018-022490 | A | 2/2018 |
| WO | WO 2019/135303 | A1 | 7/2019 |

* cited by examiner

SIGNAL PROCESSING DEVICE, SIGNAL PROCESSING METHOD, AND DETECTION SENSOR

CROSS REFERENCE TO PRIOR APPLICATION

This application is a National Stage Patent Application of PCT International Patent Application No. PCT/JP2020/042908 (filed on Nov. 18, 2020) under 35 U.S.C. § 371, which claims priority to Japanese Patent Application No. 2019-218055 (filed on Dec. 2, 2019), which are all hereby incorporated by reference in their entirety.

TECHNICAL FIELD

The present technology relates to a signal processing device, a signal processing method, and a detection sensor, and more particularly, to a signal processing device, a signal processing method, and a detection sensor enabled to detect flicker information from an output indicating a luminance change.

BACKGROUND ART

An image sensor has been devised that outputs event data representing occurrence of an event in a case where the event occurs with a luminance change of a pixel as the event (see, for example, Patent Document 1).

Here, an image sensor that captures an image in synchronization with a vertical synchronization signal and outputs frame data that is image data of one frame (screen) in a cycle of the vertical synchronization signal can be referred to as a synchronous image sensor. On the other hand, the image sensor that outputs the event data outputs the event data when the event occurs, and thus can be referred to as an asynchronous (or address controlled) image sensor. The asynchronous image sensor is called a dynamic vision sensor (DVS), for example.

In the DVS, information of a pixel having a luminance change is output, but for example, in a case where a light source in a room flickers, a luminance change occurs in the entire screen, and many events may occur. In this case, an event originally desired to be acquired is buried in many events caused by a flicker, and information originally desired to be acquired cannot be captured, so that it is necessary to remove many events caused by a flicker.

In a general CMOS image sensor that is a synchronous image sensor, for example, a technology is disclosed of detecting a flicker component by using a difference or a ratio between an image captured with a shutter time in which no flicker occurs and an image captured with a shutter time shorter than the shutter time in which no flicker occurs (see, for example, Patent Document 2).

However, since the DVS is a sensor that captures the luminance change itself and is not a method of capturing an image by defining a predetermined shutter time, this method cannot be applied.

As a noise removal method for the DVS, for example, a technology has been devised in which a flicker is also removed by controlling event output with pixels in 2×2 units (see, for example, Non-Patent Document 1).

CITATION LIST

Patent Document

Patent Document 1: Japanese Patent Application National Publication (Laid-Open) No. 2017-535999

Patent Document 2: Japanese Patent Application Laid-Open No. 2004-7402

Non-Patent Document

Non-Patent Document 1: Chenghan Li, et. Al., A 132 by 104 10 m-Pixel 250 W 1 kefps Dynamic Vision Sensor with Pixel-Parallel Noise and Spatial Redundancy Suppression 2019 Symposium on VLSI Circuits SUMMARY OF THE INVENTION

Problems to be Solved by the Invention

However, the technology of Non-Patent Document 1 may remove even a valid event, and a desired result may not be obtained.

The present technology has been made in view of such a situation, and enables flicker information to be detected from an output indicating a luminance change.

Solutions to Problems

A signal processing device of a first aspect of the present technology includes: a change detection unit that detects a first luminance change in a positive direction and a second luminance change in a negative direction among luminance changes detected by a light receiving unit; a coefficient generation unit that generates a coefficient depending on a time at which the luminance change is detected; and an integration unit that integrates a result of multiplication of the first luminance change and the coefficient and integrates a result of multiplication of the second luminance change and the coefficient.

A signal processing method of the first aspect of the present technology includes detecting a first luminance change in a positive direction and a second luminance change in a negative direction among luminance changes detected by a light receiving unit, generating a coefficient depending on a time at which the luminance change is detected, and integrating a result of multiplication of the first luminance change and the coefficient and integrating a result of multiplication of the second luminance change and the coefficient, by a signal processing device.

In the first aspect of the present technology, among the luminance changes detected by the light receiving unit, the first luminance change in the positive direction and the second luminance change in the negative direction are detected; the coefficient is generated depending on the time at which the luminance change is detected; and the result of multiplication of the first luminance change and the coefficient are integrated, and the result of multiplication of the second luminance change and the coefficient are integrated.

A detection sensor of a second aspect of the present technology includes: a light receiving unit in which pixels that perform photoelectric conversion of incident light to generate electric signals are arranged in a lattice; a change detection unit that detects a first luminance change in a positive direction and a second luminance change in a negative direction among luminance changes detected by the light receiving unit; a coefficient generation unit that generates a coefficient depending on a time at which the luminance change is detected; and an integration unit that integrates a result of multiplication of the first luminance change and the coefficient and integrates a result of multiplication of the second luminance change and the coefficient.

In the second aspect of the present technology, provided are a light receiving unit in which pixels that perform photoelectric conversion of incident light to generate electric signals are arranged in a lattice; a change detection unit that detects a first luminance change in a positive direction and a second luminance change in a negative direction among luminance changes detected by the light receiving unit; a coefficient generation unit that generates a coefficient depending on a time at which the luminance change is detected; and an integration unit that integrates a result of multiplication of the first luminance change and the coefficient and integrates a result of multiplication of the second luminance change and the coefficient.

Note that, the signal processing device of the first aspect of the present technology can be implemented by causing a computer to execute a program. The program that the computer is caused to execute can be provided by being transmitted via a transmission medium or by being recorded on a recording medium.

The signal processing device and the detection sensor each may be an independent device or an internal block included in one device.

MODE FOR CARRYING OUT THE INVENTION

Figure 1:
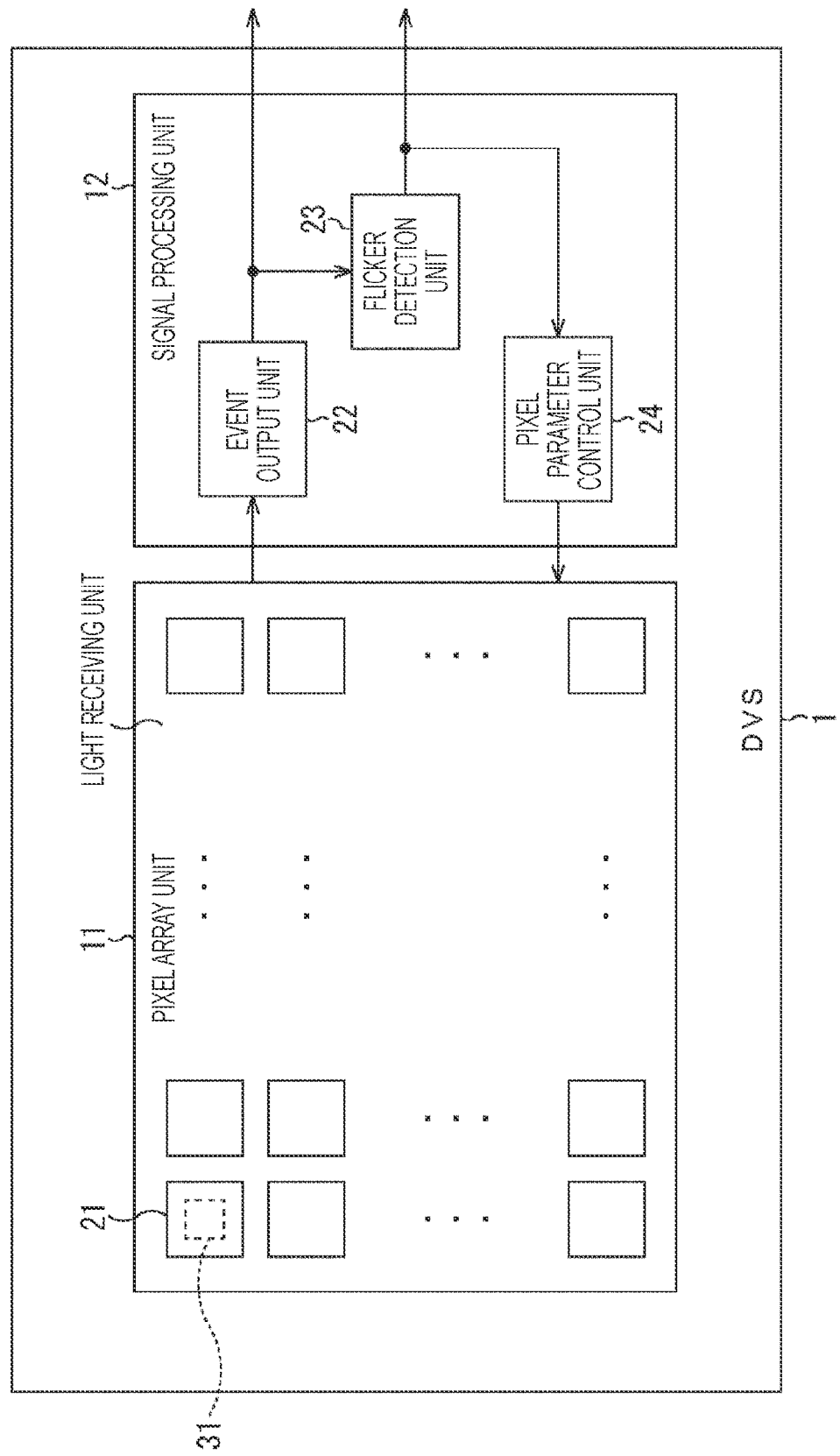
FIG. 1 is a block diagram illustrating a configuration example of an embodiment of a DVS as a sensor to which the present technology is applied.

Hereinafter, a mode for carrying out the present technology (the mode will be hereinafter referred to as the embodiment) will be described with reference to the accompanying drawings. Note that, in the present specification and the drawings, components having substantially the same functional configuration are denoted by the same reference numerals, and redundant explanations will be omitted. The description will be given in the following order.
1. Configuration example of DVS
2. Event occurrence principle by light source flicker
3. First configuration example of flicker detection unit
4. Second configuration example of flicker detection unit
5. Third configuration example of flicker detection unit
6. Processing flow of flicker control process
7. Fourth configuration example of flicker detection unit
8. Another configuration example of DVS
9. Chip configuration examples of DVS 1. Configuration Example of DVS FIG. 1 is a block diagram illustrating a configuration example of an embodiment of a DVS as a sensor (event detection sensor) to which the present technology is applied.

A DVS 1 includes a pixel array unit 11 and a signal processing unit 12.

The pixel array unit 11 includes a plurality of pixel circuits 21 each including a pixel 31 that performs photoelectric conversion of incident light to generate an electric signal, the plurality of pixel circuits 21 being arranged in a lattice on a two-dimensional plane. The pixel array unit 11 performs imaging that performs photoelectric conversion of incident light to generate an electric signal, in the pixel 31. Moreover, the pixel array unit 11 generates, in the pixel circuits 21, event data representing occurrence of an event that is a change in the electrical signal of the pixel 31, and outputs the event data to the signal processing unit 12.

In the pixel array unit 11, a portion where the plurality of pixel circuits 21 is arranged is a portion that receives incident light and performs photoelectric conversion as a whole, and thus is also referred to as a light receiving unit.

The signal processing unit 12 includes an event output unit 22, a flicker detection unit 23, and a pixel parameter control unit 24.

In a case where occurrence of an event is detected in any of the pixel circuits 21 of the pixel array unit 11, the event output unit 22 generates coordinates (xn, yn) of the pixel circuit 21 that is position information of the event, a time stamp tn that is time information of the event, and a polarity pn of the event (n=0, 1, 2, 3, . . . ), sets a valid signal that is an output flag to High, and outputs a valid signal to the outside of the DVS 1 and the flicker detection unit 23.

Figure 2:
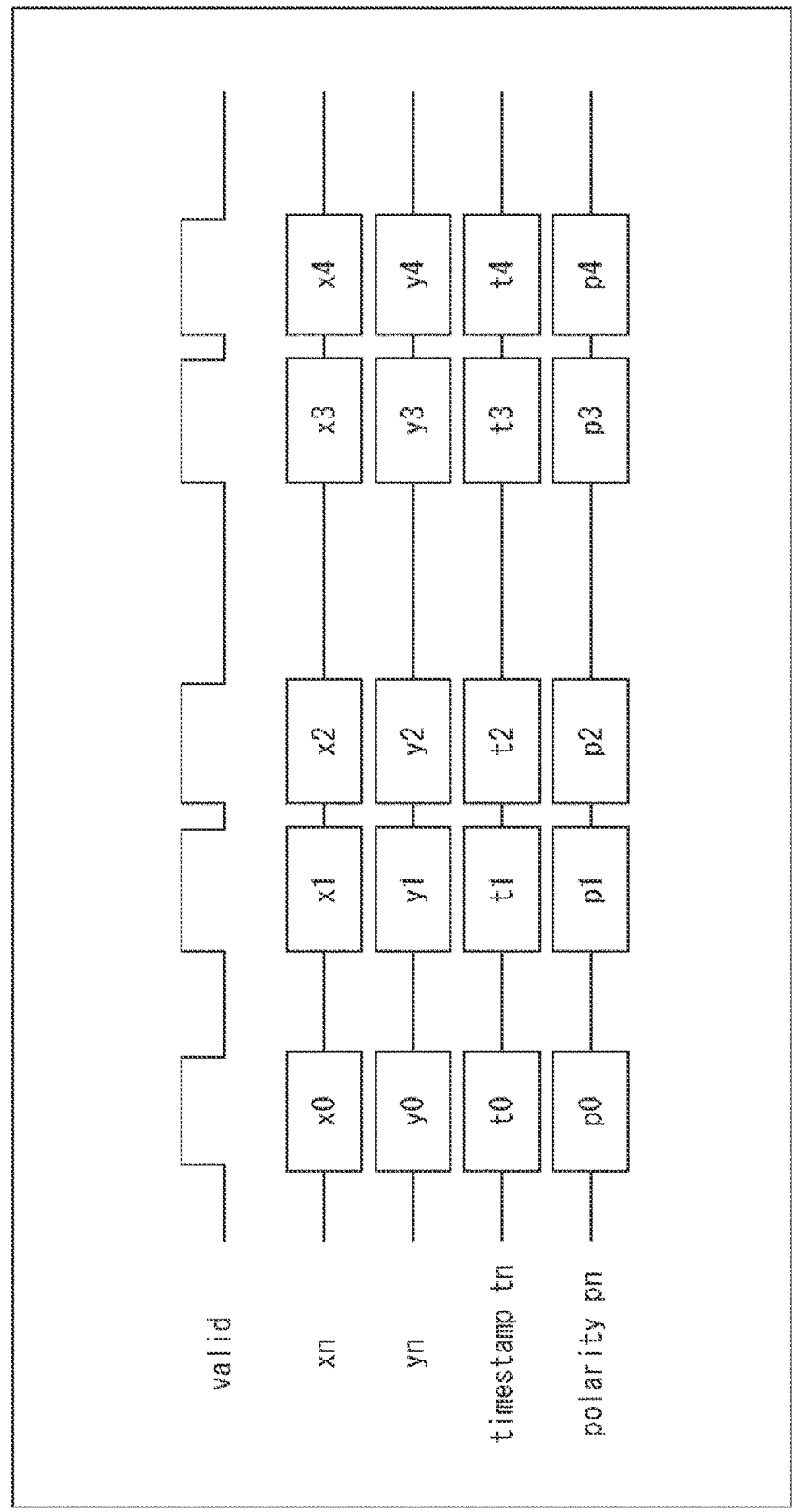
FIG. 2 is a conceptual diagram of event data.

FIG. 2 illustrates a conceptual diagram of event data output by the event output unit 22.

The coordinates (xn, yn) represent a position of the pixel circuit 21 in the pixel array unit 11 where the event occurs.

The time stamp tn represents, for example, a count value when the event occurs in a counter based on a predetermined clock signal. The count value output at a timing when the event occurs can be said to be time information representing (relative) time when the event occurs as long as an interval between events is maintained as it is at the time when the event occurs.

The polarity pn of the event represents a direction of a luminance change in a case where the luminance change (change in amount of light) exceeding a predetermined threshold value occurs as an event in the pixel 31, and represents whether the luminance change is a change in a positive direction (Hereinafter, the polarity is referred to as positive polarity.) or a change in a negative direction (Hereinafter, the polarity is referred to as negative polarity.). Specifically, the polarity pn of the event is represented by +1 when being the positive polarity, and is represented by −1 when being the negative polarity.

As illustrated in FIG. 2, in a case where the event occurs, the valid signal that is the output flag is set to High, and the coordinates (xn, yn), the time stamp tn, and the polarity pn of the event are output.

Returning to FIG. 1, the flicker detection unit 23 detects (estimates) a flicker amount by using the event data supplied from the event output unit 22, and outputs the flicker amount to the outside of the DVS 1 and the pixel parameter control unit 24.

The pixel parameter control unit 24 adjusts (controls) a sensitivity parameter of the pixel circuit 21 on the basis of the flicker amount detected by the flicker detection unit 23. That is, in a case where the flicker amount is large, the pixel parameter control unit 24 increases the threshold value of the luminance change regarded as an event to make it difficult for an event to occur, and in a case where the flicker amount is small, the pixel parameter control unit 24 decreases the threshold value of the luminance change to make it easy for an event to occur.

Configuration Example of Pixel Circuit 21

Figure 3:
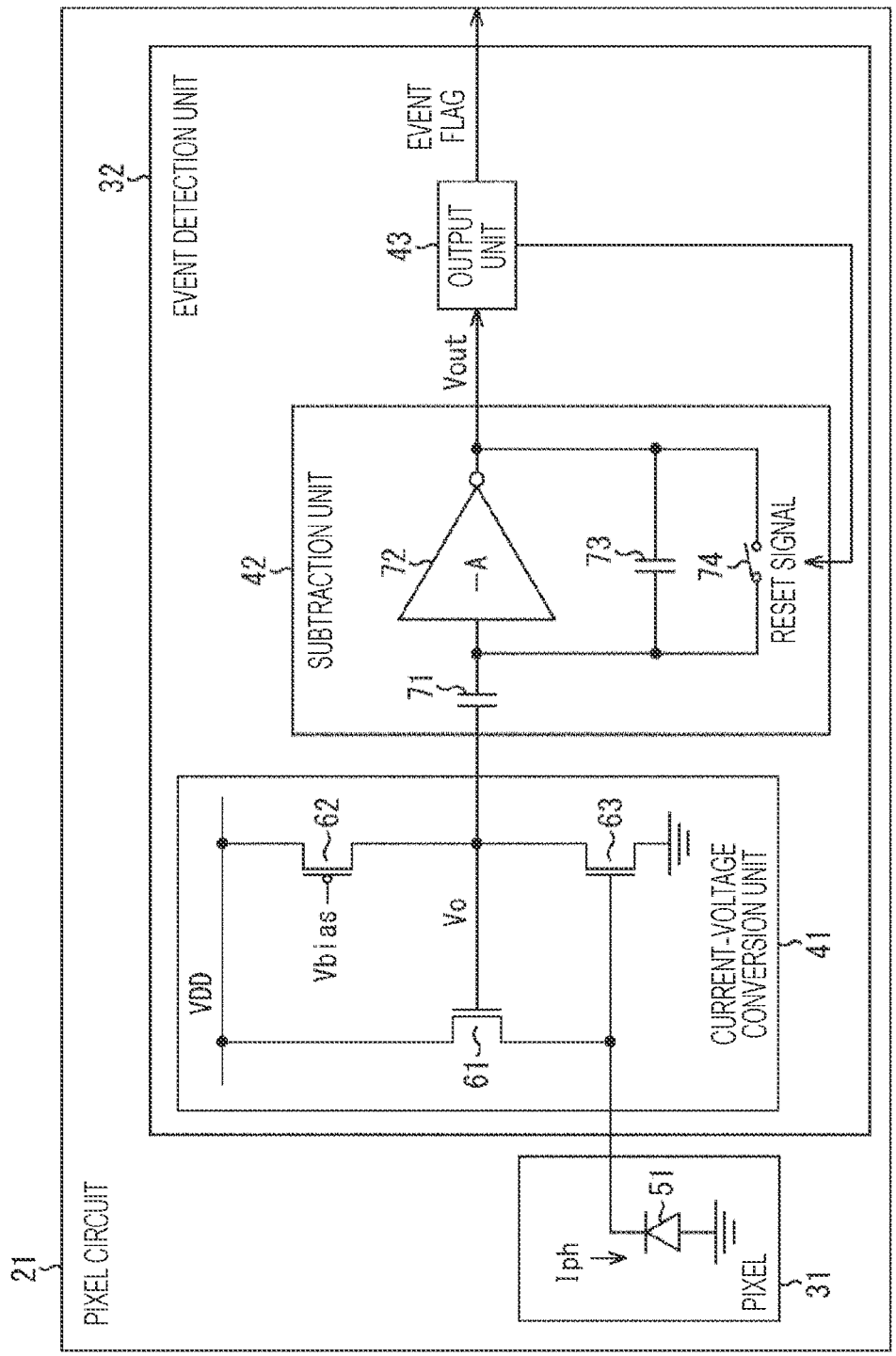
FIG. 3 is a block diagram illustrating a detailed configuration example of a pixel circuit in FIG. 1.

FIG. 3 is a block diagram illustrating a detailed configuration example of the pixel circuit 21 in FIG. 1.

The pixel circuit 21 includes the pixel 31 and an event detection unit 32.

The pixel 31 includes a photodiode (PD) 51 as a photoelectric conversion element. The pixel 31 receives light incident on the PD 51 in the PD 51, performs photoelectric conversion, and generates and causes a photocurrent (Iph) as an electric signal to flow.

In a case where a change exceeding a predetermined threshold value (including a change greater than or equal to the threshold as necessary) occurs in the photocurrent generated by the photoelectric conversion in the pixel 31, the event detection unit 32 detects the change in the photocurrent as an event. The event detection unit 32 outputs an event flag for (detection of) the event.

Here, since the change in the photocurrent generated in the pixel 31 can also be regarded as a change in amount of light of the light incident on the pixel 31, the event can also be said to be a change in amount of light in the pixel 31 (change in amount of light exceeding the threshold value).

The event detection unit 32 includes a current-voltage conversion unit 41, a subtraction unit 42, and an output unit 43.

The current-voltage conversion unit 41 converts the photocurrent from the pixel 31 into a voltage (hereinafter, also referred to as a photovoltage) Vo corresponding to a logarithm of the photocurrent, and outputs the voltage Vo to the subtraction unit 42.

The current-voltage conversion unit 41 includes FETs 61 to 63. As the FETs 61 and 63, for example, an N-type MOS FET can be adopted, and as the FET 62, for example, a P-type MOS (PMOS) FET can be adopted.

The source of the FET 61 is connected to the gate of the FET 63, and the photocurrent by the pixel 31 flows through a connection point between the source of the FET 61 and the gate of the FET 63. The drain of the FET 61 is connected to a power supply VDD, and the gate thereof is connected to the drain of the FET 63.

The source of the FET 62 is connected to the power supply VDD, and the drain thereof is connected to a connection point between the gate of the FET 61 and the drain of the FET 63. A predetermined bias voltage Vbias is applied to the gate of the FET 62.

The source of the FET 63 is grounded.

In the current-voltage conversion unit 41, the drain of the FET 61 is connected to the power supply VDD side and makes a source follower. The PD 51 of the pixel 31 is connected to the source of the FET 61 that makes the source follower, whereby a photocurrent due to charge generated by photoelectric conversion of the PD 51 of the pixel 31 flows through (the drain to the source of) the FET 61. The FET 61 operates in a subthreshold region, and the photovoltage Vo corresponding to the logarithm of the photocurrent flowing through the FET 61 appears at the gate of the FET 61. As described above, in the current-voltage conversion unit 41, the photocurrent from the pixel 31 is converted by the FET 61 into the photovoltage Vo corresponding to the logarithm of the photocurrent.

The photovoltage Vo is output to the subtraction unit 42 from the connection point between the gate of the FET 61 and the drain of the FET 63.

The subtraction unit 42 calculates a difference between a present photovoltage and a photovoltage at a timing slightly different from the present with respect to the photovoltage Vo from the current-voltage conversion unit 41, and outputs a difference signal Vout corresponding to the difference to the output unit 43.

The subtraction unit 42 includes a capacitor 71, an operational amplifier 72, a capacitor 73, and a switch 74.

One end of the capacitor 71 is connected to (a connection point between the FETs 62 and 63 of) the current-voltage conversion unit 41, and the other end is connected to an input terminal of the operational amplifier 72. Thus, the photovoltage Vo is input to the (inverting) input terminal of the operational amplifier 72 via the capacitor 71.

An output terminal of the operational amplifier 72 is connected to the output unit 43.

One end of the capacitor 73 is connected to the input terminal of the operational amplifier 72, and the other end is connected to the output terminal of the operational amplifier 72.

The switch 74 is connected to the capacitor 73 to turn on/off connection between both ends of the capacitor 73. The switch 74 turns on/off the connection between both ends of the capacitor 73 by turning on/off in accordance with a reset signal from the output unit 43.

The capacitor 73 and the switch 74 constitute a switched capacitor. When the switch 74 that has been turned off is temporarily turned on, and turned off again, the capacitor 73 is reset to a state in which charge is discharged and charge can be newly accumulated.

The photovoltage Vo of the capacitor 71 on the current-voltage conversion unit 41 side when the switch 74 is turned on is represented as Vinit, and capacitance (electrostatic capacitance) of the capacitor 71 is represented as C1. The input terminal of the operational amplifier 72 is a virtual ground, and charge Qinit accumulated in the capacitor 71 in a case where the switch 74 is turned on is expressed by Formula (1).

$$Q_{init} = C1 \times V_{init} \tag{1}$$

Furthermore, in the case where the switch 74 is turned on, both ends of the capacitor 73 are short-circuited, so that the charge accumulated in the capacitor 73 is zero.

Thereafter, when the photovoltage Vo of the capacitor 71 on the current-voltage conversion unit 41 side in a case where the switch 74 is turned off is represented as Vafter, charge Qafter accumulated in the capacitor 71 in a case where the switch 74 is turned off is expressed by Formula (2).

$$Q\text{after} = C1 \times V\text{after} \quad (2)$$

When capacitance of the capacitor 73 is represented as C2, charge Q2 accumulated in the capacitor 73 is expressed by Formula (3) using the difference signal Vout that is an output voltage of the operational amplifier 72.

$$Q2 = -C2 \times V\text{out} \quad (3)$$

Before and after the switch 74 is turned off, a total amount of charge of the charge of the capacitor 71 and the charge of the capacitor 73 does not change, so that Formula (4) is established.

$$Q\text{init} = Q\text{after} + Q2 \quad (4)$$

When Formulas (1) to (3) are substituted into Formula (4), Formula (5) is obtained.

$$V\text{out} == (C1/C2) \times (V\text{after} - V\text{init}) \quad (5)$$

According to Formula (5), in the subtraction unit 42, subtraction is performed between the photovoltage Vafter and Vinit, that is, calculation is performed of the difference signal Vout corresponding to a difference (Vinit−Vafter) between the photovoltage Vinit and the photovoltage Vafter. According to Formula (5), a subtraction gain of the subtraction unit 42 is C1/C2. Thus, the subtraction unit 42 outputs a voltage obtained by multiplying a change in the photovoltage Vo after resetting of the capacitor 73 by C1/C2 as the difference signal Vout.

The output unit 43 compares the difference signal Vout output by the subtraction unit 42 with predetermined threshold values (voltages) +Vth and −Vth used for detecting an event. In a case where the difference signal Vout is greater than or equal to the threshold value +Vth or less than or equal to the threshold value −Vth, the output unit 43 outputs the event flag indicating that a change in amount of light as an event has been detected (has occurred).

For example, in a case where the difference signal Vout is greater than or equal to the threshold value +Vth, the output unit 43 determines that the event having the positive polarity is detected and outputs the event flag of +1, and in a case where the difference signal Vout is less than or equal to the threshold value −Vth, the output unit 43 determines that the event having the negative polarity is detected and outputs the event flag of −1.

When the event is detected, the output unit 43 resets the capacitor 73 by outputting the reset signal for temporarily turning on and off the switch 74.

Note that in a case where the switch 74 is kept turned on, the difference signal Vout is fixed to a predetermined reset level, and the event detection unit 32 cannot detect a change in amount of light as an event. Similarly, also in a case where the switch 74 is kept turned off, the event detection unit 32 cannot detect a change in amount of light as an event.

In the pixel circuit 21 configured as described above, the luminance change (change in amount of light) exceeding the predetermined threshold value can be regarded as an event, and the event flag can be output. Adjustment of the threshold value of the luminance change regarded as an event by the pixel parameter control unit 24 can be performed by changing the threshold values (voltages)+Vth and −Vth of the output unit 43. Alternatively, the adjustment may be performed by making the capacitance C1 of the capacitor 71 and the capacitance C2 of the capacitor 73 of the subtraction unit 42 variable to adjust the gain C1/C2, and changing a level of the difference signal Vout.

Generation of Frame Data Depending on Event Data

Figure 4:
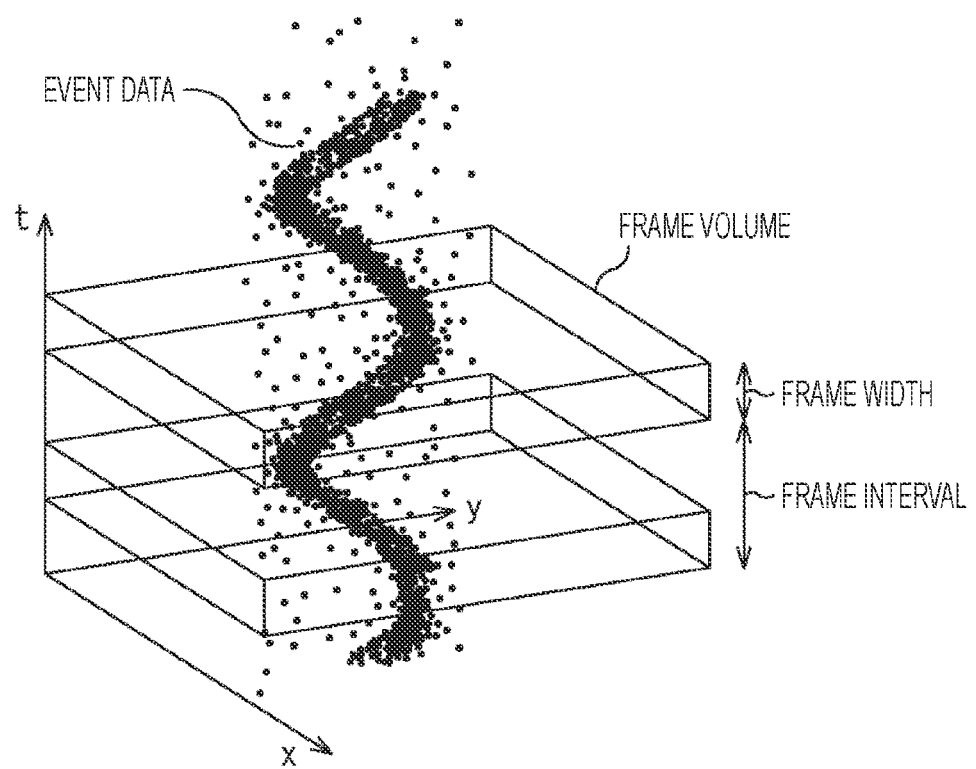
FIG. 4 is a diagram explaining an example of a method of generating frame data.

FIG. 4 is a diagram explaining an example of a method of generating frame data depending on event data.

In FIG. 4, in a three-dimensional (time) space configured by an x axis, a y axis, and a time axis t, points as event data are plotted at a time t of an event and (coordinates as) a position (x, y) of the event included in the event data.

That is, when a position (x, y, t) in the three-dimensional space represented by the time t of the event and the position (x, y) of the event included in the event data is referred to as a spatiotemporal position of the event, in FIG. 4, the event data is plotted as a point at the spatiotemporal position (x, y, t) of the event.

With the event data output from the DVS 1 as a pixel value, it is possible to generate an event image by using event data within a predetermined frame width from the beginning of a predetermined frame interval, for each predetermined frame interval.

The frame width and the frame interval can be designated by time, or can be designated by the number of pieces of event data. One of the frame width or the frame interval may be designated by time, and the other may be designated by the number of pieces of event data.

Here, in a case where the frame width and the frame interval are designated by time, and the frame width and the frame interval are the same, frame volumes are in a state of being in contact with each other without a gap. Furthermore, in a case where the frame interval is greater than the frame width, the frame volumes are arranged with a gap. In a case where the frame width is greater than the frame interval, the frame volumes are arranged in a partially overlapping manner.

Generation of the event image can be performed, for example, by setting (the pixel value of) the pixel of the frame at the position (x, y) of the event to white and setting the pixel at another position of the frame to a predetermined color such as gray.

In addition, in a case where the polarity of the change in amount of light as the event can be specified for the event data, the frame data can be generated in consideration of the polarity. For example, in a case where the polarity is positive, the pixel can be set to white, and in a case where the polarity is negative, the pixel can be set to black.

2. Event Occurrence Principle by Light Source Flicker

An event occurrence principle by a light source flicker will be described with reference to FIG. 5.

When event detection is performed under an environment using a light source having a power supply frequency of 50 Hz, the light source generates a flicker at 100 Hz that is twice the power supply frequency of 50 Hz.

Figure 5:
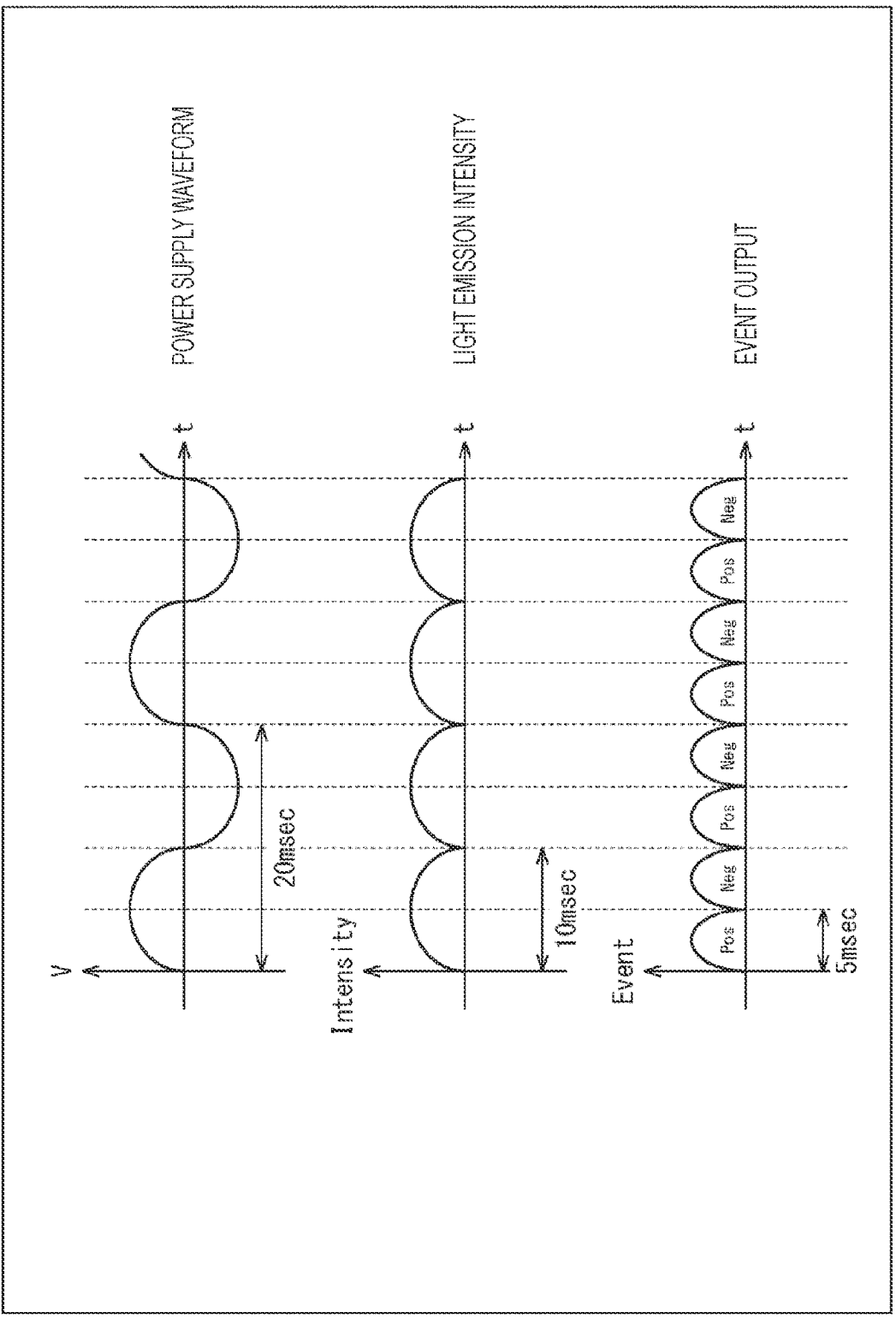
FIG. 5 is a diagram explaining an event occurrence principle by a light source flicker.

As illustrated in FIG. 5, one cycle of the light source having the power supply frequency of 50 Hz is 20 msec, and the flicker occurs at a cycle of 10 msec that is double the cycle of the light source, in light emission intensity detected by the DVS 1.

When the events are classified into a positive polarity event (Hereinafter, the positive polarity event is also referred to as a positive event.) and a negative polarity event (hereinafter, a negative event), the positive event and the negative event are alternately detected at 5 msec as illustrated in FIG. 5.

Figure 6:
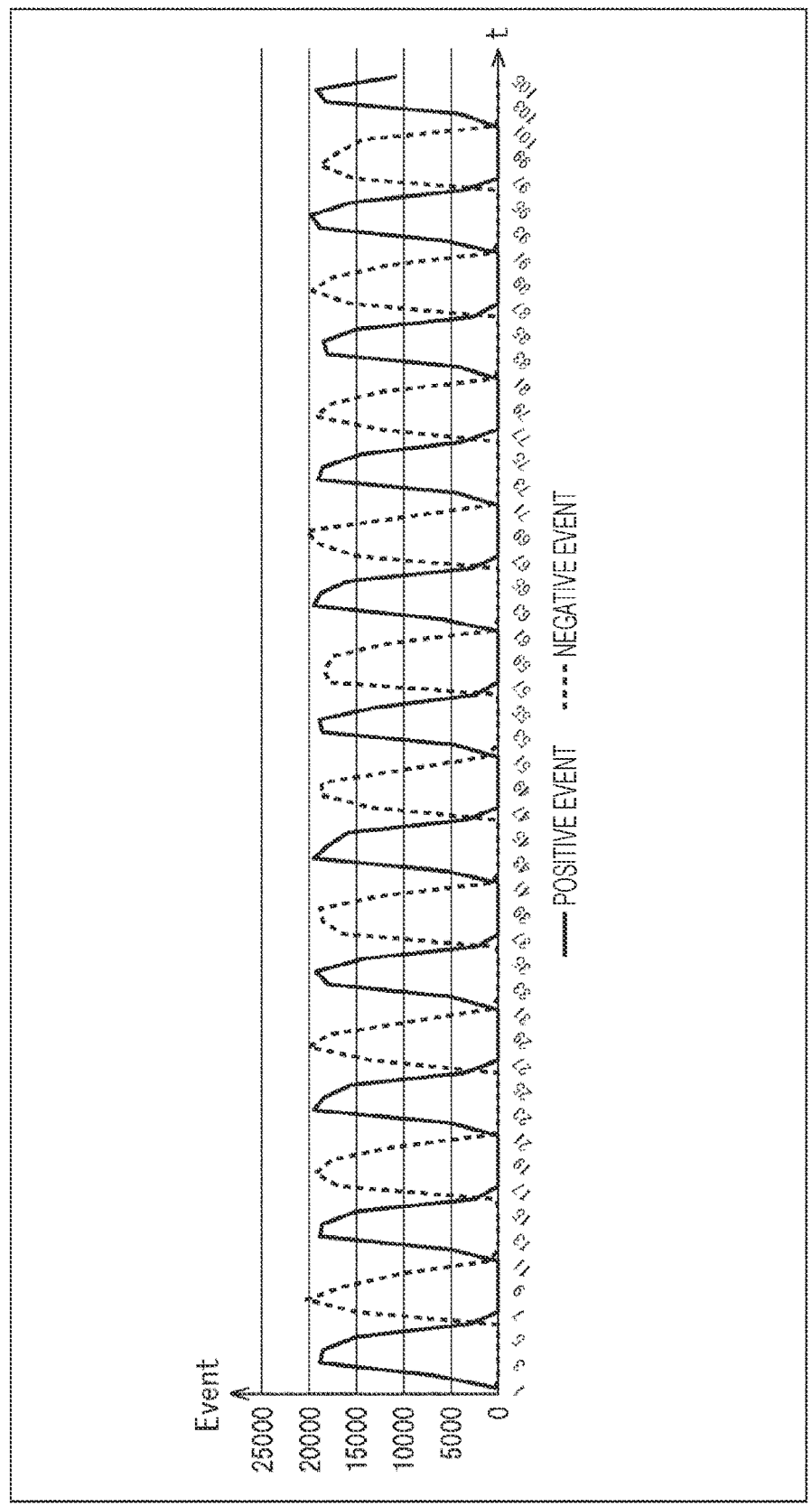
FIG. 6 is a diagram illustrating a result of detecting an event under a light source having a power supply frequency of 50 Hz.

FIG. 6 illustrates a result of actually detecting an event under the light source having the power supply frequency of 50 Hz.

FIG. 6 illustrates a result of integrating the number of events for 10 msec at 1 msec intervals, in other words, the number of events of each of the positive event and the negative event in a case where the frame width is 10 msec and the frame interval is 1 msec.

As described above, when each of the positive event and the negative event is looked at, an event with 10 msec as one cycle occurs under the light source having the power supply frequency of 50 Hz.

Thus, the flicker detection unit 23 of the DVS 1 integrates the events separately for the positive event and the negative event, and detects presence or absence of the flicker by detecting periodicity of the change.

Note that, in the following description, as an example, a description will be given of a case where the flicker detection unit 23 detects a flicker with 10 msec as one cycle generated under the light source having the power supply frequency of 50 Hz.

3. First Configuration Example of Flicker Detection Unit

Figure 7:
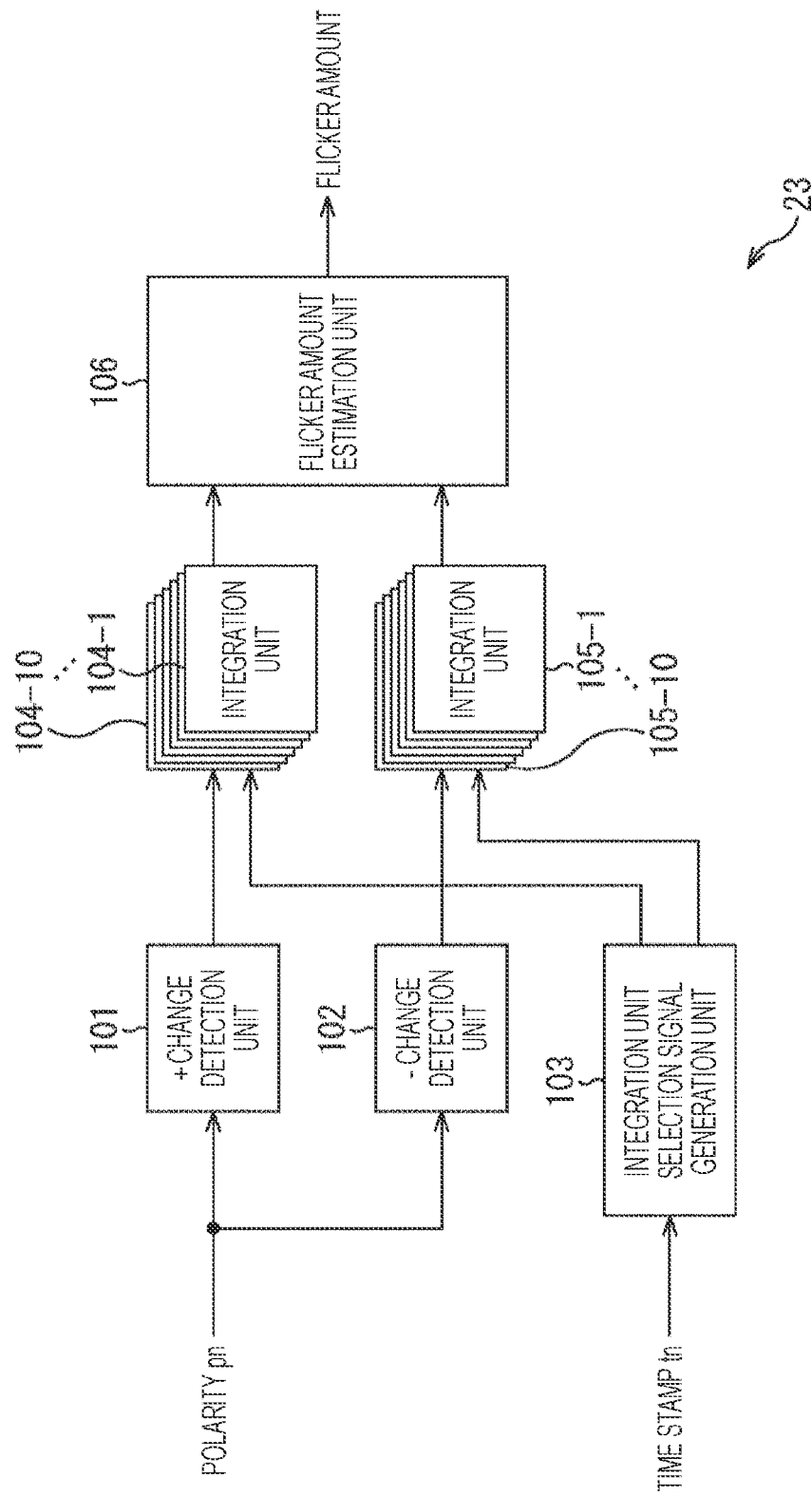
FIG. 7 is a block diagram illustrating a first configuration example of a flicker detection unit.

FIG. 7 is a block diagram illustrating a first configuration example of the flicker detection unit 23.

The flicker detection unit 23 includes a + change detection unit 101, a − change detection unit 102, an integration unit selection signal generation unit 103, integration units 104-1 to 104-10, integration units 105-1 to 105-10, and a flicker amount estimation unit 106.

The + change detection unit 101 detects a positive event among the polarities pn of the event data supplied from the event output unit 22, and supplies the positive event to any one of the integration units 104-1 to 104-10.

The − change detection unit 102 detects a negative event among the polarities pn of the event data supplied from the event output unit 22, and supplies the negative event to any one of the integration units 105-1 to 105-10.

The integration unit selection signal generation unit 103 sequentially switches the integration units 104-1 to 104-10 at time intervals of 1 msec on the basis of the time stamp tn supplied from the event output unit 22. Similarly, the integration unit selection signal generation unit 103 sequentially switches the integration units 105-1 to 105-10 at time intervals of 1 msec.

In other words, the positive event detected by the + change detection unit 101 is supplied to any one of the integration units 104-1 to 104-10 selected by a selection signal from the integration unit selection signal generation unit 103. The negative event detected by the − change detection unit 102 is supplied to any one of the integration units 105-1 to 105-10 selected by a selection signal from the integration unit selection signal generation unit 103.

Each of the integration units 104-1 to 104-10 is a memory that stores an event occurring in a time of 1 msec, and stores a positive event supplied from the + change detection unit 101.

Each of the integration units 105-1 to 105-10 is a memory that stores an event occurring in a time of 1 msec, and stores a negative event supplied from the − change detection unit 102.

The flicker amount estimation unit 106 estimates the flicker amount on the basis of positive event integration information for 10 msec stored in the integration units 104-1 to 104-10 and negative event integration information for 10 msec stored in the integration units 105-1 to 105-10.

That is, the flicker amount estimation unit 106 estimates the flicker amount occurring at a specific frequency (50 Hz in this example) by detecting periodicity of the event having 10 msec as one cycle as illustrated in FIG. 6, for each of the positive event and the negative event.

Thus, according to the first configuration example of the flicker detection unit 23, flicker information can be detected from an output indicating the luminance change.

As described above, in a case where the flicker with 10 msec as one cycle is detected, there may be a configuration in which a memory (integration units 104 and 105) that stores an event for a time of 1 msec is prepared for 10 msec for each of the positive event and the negative event.

However, in the first configuration example, it is necessary to secure a large memory capacity, and the memory capacity further increases depending on the number of events that can be stored in a time width of 10 msec.

Thus, other configurations implemented with a small memory capacity will be described below.

4. Second Configuration Example of Flicker Detection Unit

Figure 8:
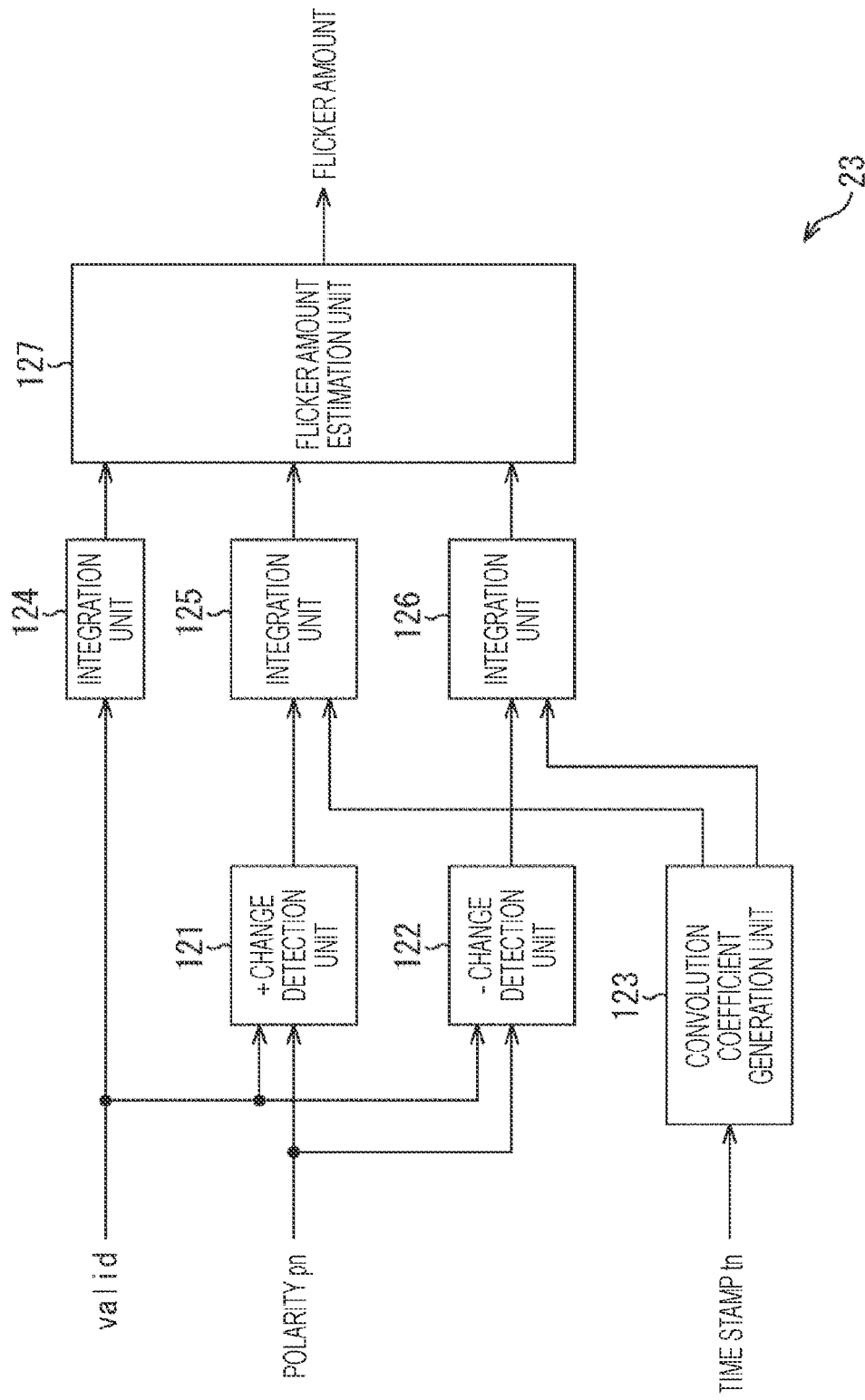
FIG. 8 is a block diagram illustrating a second configuration example of the flicker detection unit.

FIG. 8 is a block diagram illustrating a second configuration example of the flicker detection unit 23.

The flicker detection unit 23 includes a + change detection unit 121, a − change detection unit 122, a convolution coefficient generation unit 123, integration units 124 to 126, and a flicker amount estimation unit 127.

The + change detection unit 121 detects a positive event among the polarities pn of the event data supplied from the event output unit 22, and supplies the positive event to the integration unit 125. The + change detection unit 121 represents cases as an on/off signal in which a case where a positive event is detected is High (1) and a case where a positive event is not detected is Low (0).

The − change detection unit 122 detects a negative event among the event data supplied from the event output unit 22, and supplies the negative event to the integration unit 126. The − change detection unit 122 represents cases as an on/off signal in which a case where a negative event is detected is High (1) and a case where a positive event is not detected is Low (0).

The convolution coefficient generation unit 123 generates a coefficient (convolution coefficient) of a convolution operation performed by the integration units 125 and 126 using the time stamp tn as an argument, thereby generating a coefficient depending on a time at which a luminance change as an event occurs. Specifically, the convolution coefficient generation unit 123 substitutes the time stamp tn as an argument into a sine function and a cosine function of a flicker cycle desired to be detected, and supplies values (function values) obtained as a result to the integration units 125 and 126, as convolution coefficients. Note that, instead of the sine function and the cosine function, approximation functions approximating the sine function and the cosine function may be used, and approximate values obtained by substituting the time stamp tn as an argument into the approximation functions may be supplied to the integration units 125 and 126.

The integration unit 124 integrates the number of events on the basis of the valid signal indicating presence or absence of occurrence of an event, and supplies an integration result to the flicker amount estimation unit 127.

The integration unit 125 uses occurrence of the positive event as an on/off signal, and performs multiplication by the convolution coefficient supplied from the convolution coefficient generation unit 123 to perform integration. An integration result is supplied to the flicker amount estimation unit 127.

The integration unit 126 uses occurrence of the negative event as an on/off signal, and performs multiplication by the convolution coefficient supplied from the convolution coefficient generation unit 123 to perform integration. An integration result is supplied to the flicker amount estimation unit 127.

The flicker amount estimation unit 127 calculates an amplitude component of a flicker frequency by using the integration results supplied from the respective integration units 124 to 126, and estimates the flicker amount (flicker likeness) occurring at a specific frequency (flicker frequency).

Figure 9:
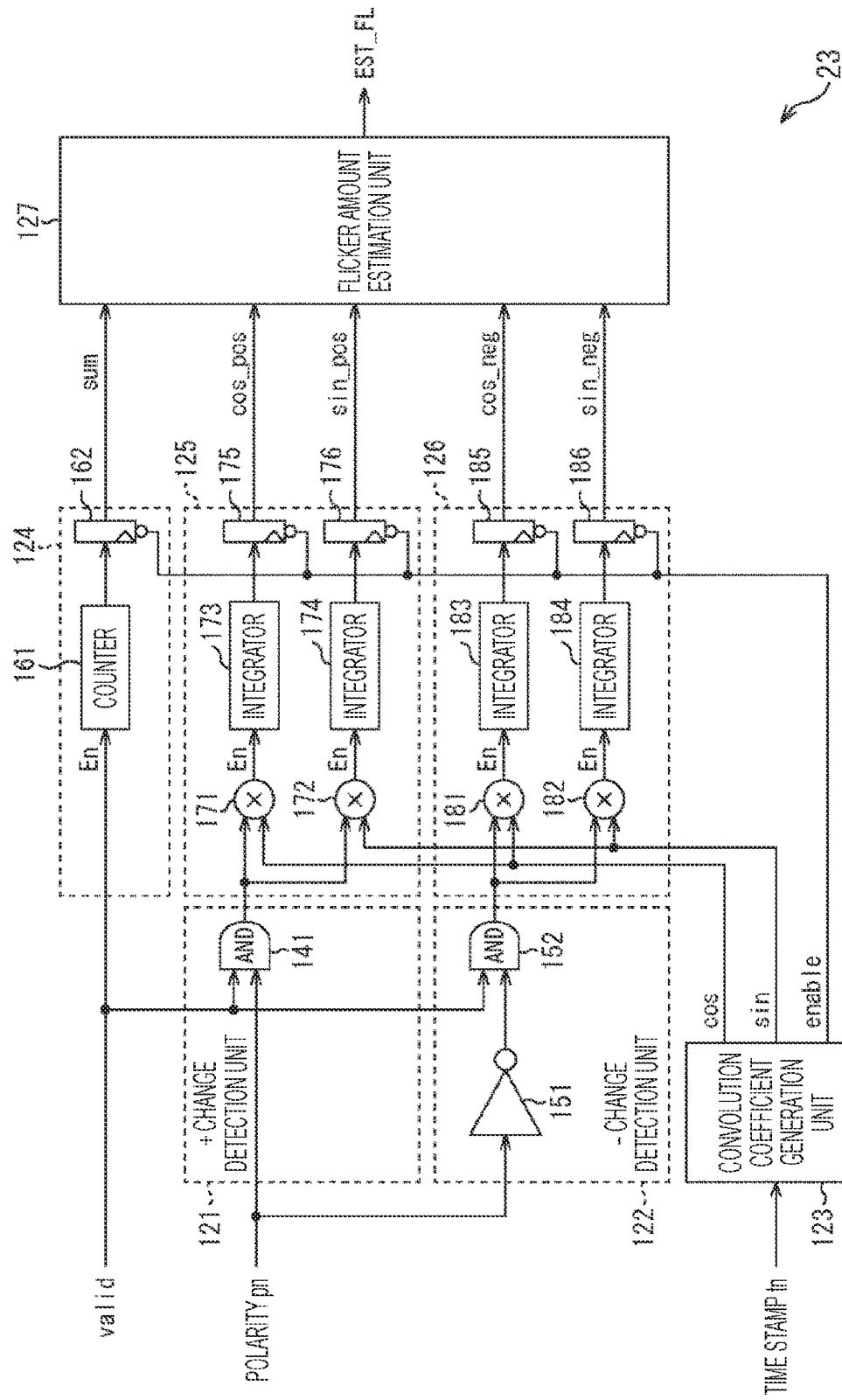
FIG. 9 is a diagram illustrating a detailed configuration example of the flicker detection unit according to the second configuration example.

FIG. 9 illustrates a configuration example of a logic circuit that implements the flicker detection unit 23 according to the second configuration example illustrated in FIG. 8.

The + change detection unit 121 includes an AND circuit 141.

The − change detection unit 122 includes an inverter 151 and an AND circuit 152.

The integration unit 124 includes a counter 161 and an output unit 162.

The integration unit 125 includes multipliers 171 and 172, integrators 173 and 174, and output units 175 and 176.

The integration unit 126 includes multipliers 181 and 182, integrators 183 and 184, and output units 185 and 186.

The valid signal and the polarity pn indicating the positive polarity or the negative polarity are input to the AND circuit 141 of the + change detection unit 121. The AND circuit 141 operates an AND (logical product) of the valid signal and the polarity pn, and supplies an operation result to the multipliers 171 and 172 of the integration unit 125.

The inverter 151 of the − change detection unit 122 inverts logic of the polarity pn to be input and supplies the inverted polarity to the AND circuit 152. The valid signal and the inverted polarity pn are input to the AND circuit 152. The AND circuit 152 operates an AND (logical product) of the valid signal and the inverted polarity pn, and supplies an operation result to the multipliers 181 and 182 of the integration unit 126.

The convolution coefficient generation unit 123 supplies the function values obtained by substituting the time stamp tn into the sine function and the cosine function of the flicker cycle desired to be detected to the integration units 125 and 126, as the convolution coefficients.

Note that, in the present embodiment, as will be described with reference to FIGS. 10 to 12, the function values depending on the time stamp tn are calculated by using a sine approximation function and a cosine approximation function approximating the sine function and the cosine function to signals having two values of 1 and −1. The function value of the sine approximation function is supplied to the multipliers 172 and 182, and the function value of the cosine approximation function is supplied to the multipliers 171 and 181.

The convolution coefficient generation unit 123 supplies an enable signal indicating an output timing of the integration result to the output unit 162, the output units 175 and 176, and the output units 185 and 186.

The counter 161 of the integration unit 124 counts the number of events sum on the basis of a valid signal indicating the presence or absence of occurrence of an event, and supplies a count result to the output unit 162.

The output unit 162 includes, for example, a flip-flop, acquires the number of events sum of the counter 161 at a timing when the enable signal supplied from the convolution coefficient generation unit 123 is turned on (High), and supplies the number of events sum to the flicker amount estimation unit 127 (FIG. 8).

The multiplier 171 of the integration unit 125 supplies, to the integrator 173, a multiplication result obtained by multiplying an AND operation result of the AND circuit 141 of the + change detection unit 121 by the function value of the cosine approximation function. The multiplier 172 supplies, to the integrator 174, a multiplication result obtained by multiplying the AND operation result of the AND circuit 141 of the + change detection unit 121 by the function value of the sine approximation function.

The integrator 173 integrates the multiplication result supplied from the multiplier 171 and supplies the integrated multiplication result to the output unit 175. The integrator 174 integrates the multiplication result supplied from the multiplier 172 and supplies the integrated multiplication result to the output unit 176.

The output unit 175 includes, for example, a flip-flop, acquires an integral value cos_pos of the integrator 173 at a timing when the enable signal supplied from the convolution coefficient generation unit 123 is turned on, and supplies the integral value cos_pos to the flicker amount estimation unit 127.

The output unit 176 includes, for example, a flip-flop, acquires an integral value sin_pos of the integrator 174 at the timing when the enable signal supplied from the convolution coefficient generation unit 123 is turned on, and supplies the integral value sin_pos to the flicker amount estimation unit 127.

The multiplier 181 of the integration unit 126 supplies, to the integrator 183, a multiplication result obtained by multiplying an AND operation result of the AND circuit 152 of the − change detection unit 122 by the function value of the cosine approximation function. The multiplier 182 supplies, to the integrator 184, a multiplication result obtained by multiplying the AND operation result of the AND circuit 152 of the − change detection unit 122 by the function value of the sine approximation function.

The integrator 183 integrates the multiplication result supplied from the multiplier 181 and supplies the integrated multiplication result to the output unit 185.

The integrator 184 integrates the multiplication result supplied from the multiplier 182 and supplies the integrated multiplication result to the output unit 186.

The output unit 185 includes, for example, a flip-flop, acquires an integral value cos_neg of the integrator 183 at the timing when the enable signal supplied from the convolution coefficient generation unit 123 is turned on, and supplies the integral value cos_neg to the flicker amount estimation unit 127.

The output unit 186 includes, for example, a flip-flop, acquires an integral value sin_neg of the integrator 184 at the timing when the enable signal supplied from the convolution coefficient generation unit 123 is turned on, and supplies the integral value sin_neg to the flicker amount estimation unit 127.

The flicker amount estimation unit 127 calculates the amplitude component of the flicker frequency by using the integration results supplied from the respective integration units 124 to 126, and estimates the flicker amount (flicker likeness).

Specifically, the flicker amount estimation unit 127 calculates a flicker amount EST_FL by Formula (6) or Formula (7) using the number of events sum, the integral values cos_pos, sin_pos, cos_neg, and sin_neg.

[Expression 1]

$$\text{EST\_FL} = (|\text{sin\_pos} - \text{sin\_neg}| + |\text{cos\_pos} - \text{cos\_neg}|) / \text{sum} \quad (6)$$

$$\text{EST\_FL} = (|\text{sin\_pos} - \text{sin\_neg}|^2 + |\text{cos\_pos} - \text{cos\_neg}|^2) / \text{sum} \quad (7)$$

The integral value cos_pos represents a positive event responding to the phase of the cosine function, and the integral value sin_pos represents a positive event responding to the phase of the sine function. The integral value cos_neg represents a negative event responding to the phase of the cosine function, and the integral value sin_neg represents a negative event responding to the phase of the sine function. In a case where the flicker of a target cycle does not occur, detected events are substantially uniform, and the flicker amount EST_FL is a small value. On the other hand, in a case where the flicker of the target cycle occurs, a value of the numerator of Formula (6) or Formula (7) increases, and the flicker amount EST_FL is a large value.

Note that the timing when the enable signal is turned on can be, for example, 10 msec that is the same as the flicker cycle (one cycle) desired to be detected. In this case, the output units 162, 175, 176, 185, and 186 integrate the number of events sum, the integral values cos_pos, sin_pos, cos_neg, and sin_neg in units of flicker cycles. Alternatively, an integration period may be an integral multiple of the flicker cycle.

Figure 10:
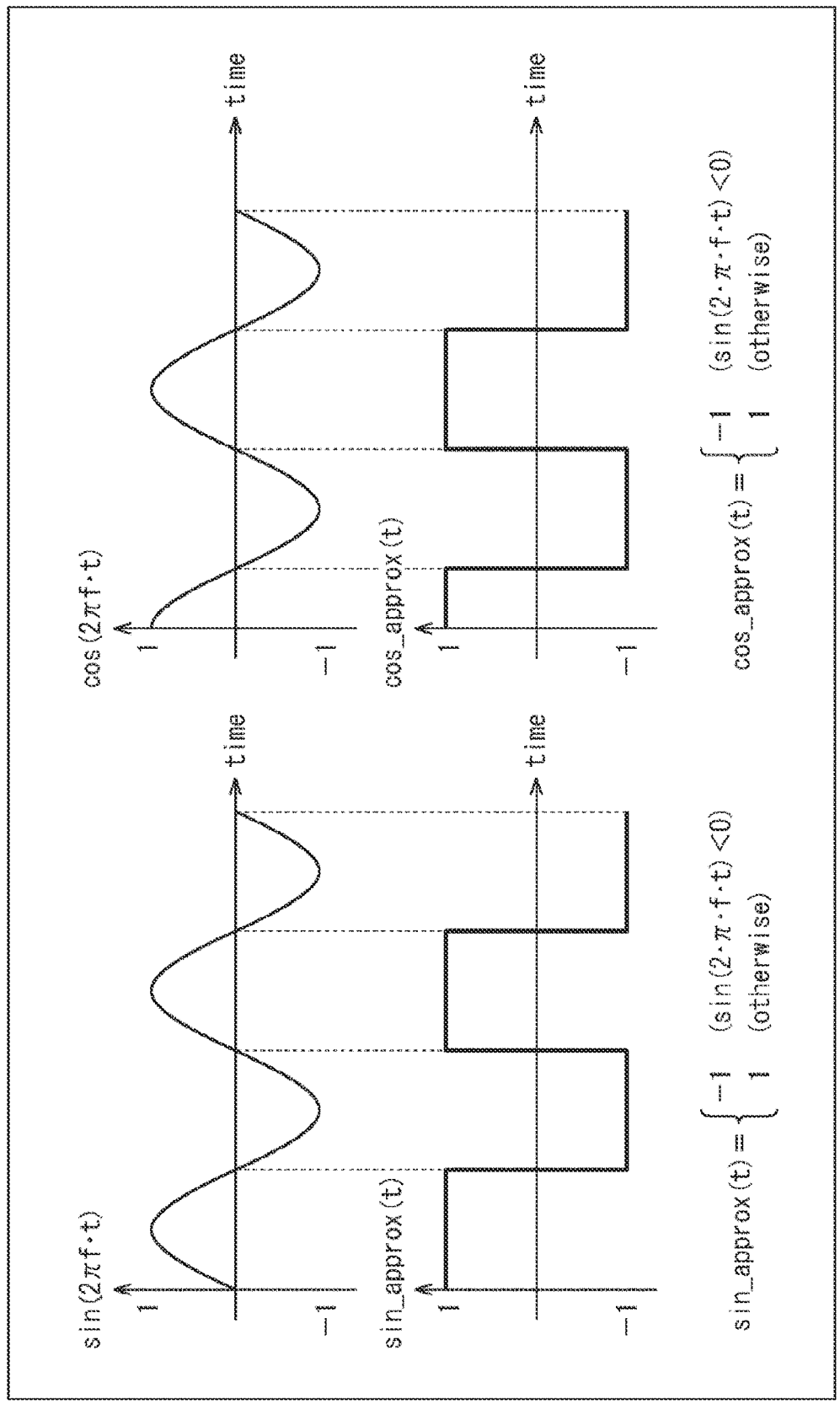
FIG. 10 is a diagram illustrating examples of a sine function, a cosine function, a sine approximation function, and a cosine approximation function.

FIG. 10 illustrates examples of the sine function and the cosine function generated by the convolution coefficient generation unit 123, or the sine approximation function and the cosine approximation function approximating the sine function and the cosine function.

As illustrated in the upper part of FIG. 10, the convolution coefficient generation unit 123 may generate function values obtained by substituting the time stamp tn into the sine function and the cosine function each having a flicker cycle desired to be detected as one cycle; however, in the present embodiment, as illustrated in the lower part of FIG. 10, function values depending on the time stamp tn are calculated by using the sine approximation function and the cosine approximation function approximating the sine function and the cosine function to signals having two values of 1 and −1.

When the sine approximation function and the cosine approximation function are expressed by sin_approx(t) and cos_approx(t), the sine approximation function and the cosine approximation function can be expressed by the following formula.

[Expression 2]

$$\text{sin\_approx}(t) = \begin{cases} -1 & (\sin(2 \cdot \pi \cdot f \cdot t) < 0) \\ 1 & (\text{otherwise}) \end{cases} \quad (8)$$

$$\text{cos\_approx}(t) = \begin{cases} -1 & (\cos(2 \cdot \pi \cdot f \cdot t) < 0) \\ 1 & (\text{otherwise}) \end{cases} \quad (9)$$

In Formula (8) and Formula (9), f represents the flicker cycle, and t represents the time stamp tn. With this approximation, the sine approximation function and the cosine approximation function are approximated to signals that output +1 when the sine function and the cosine function are positive and output −1 when the sine function and the cosine function are negative, as illustrated in FIG. 10. Since the flicker cycle is now 10 msec, outputs of the sine approximation function and the cosine approximation function switch between +1 and −1 in units of 5 msec.

As such a sine approximation function and a cosine approximation function, for example, a configuration can be adopted in which a table in which +1 or −1 is associated with each time (time stamp tn) of one cycle in the convolution coefficient generation unit 123 is stored, and function values of the sine approximation function and the cosine approximation function are output on the basis of the table.

Figure 11:
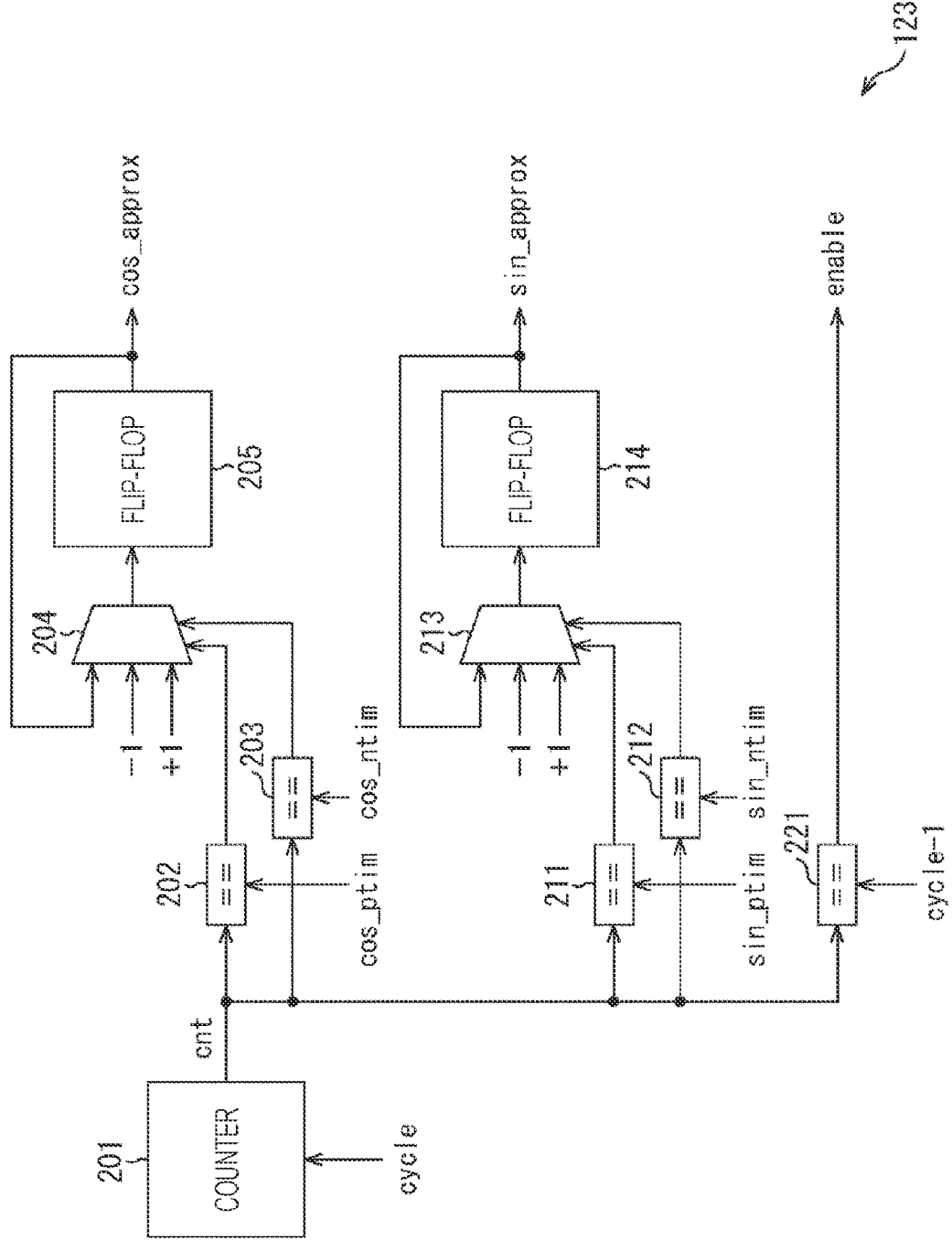
FIG. 11 is a diagram illustrating a circuit configuration example of a convolution coefficient generation unit in FIG. 10.

In addition, the sine approximation function and the cosine approximation function can also be implemented by a logic circuit as illustrated in FIG. 11.

FIG. 11 illustrates a circuit configuration example of the convolution coefficient generation unit 123 in a case where the sine approximation function and the cosine approximation function illustrated in FIG. 10 are adopted.

The convolution coefficient generation unit 123 in FIG. 11 includes a counter 201 that performs counting corresponding to the flicker cycle.

Furthermore, the convolution coefficient generation unit 123 includes comparators 202 and 203, a selector 204, and a flip-flop 205 as a configuration for outputting a function value cos_approx of the cosine approximation function depending on the time stamp tn.

Moreover, the convolution coefficient generation unit 123 includes comparators 211 and 212, a selector 213, and a flip-flop 214 as a configuration for outputting a function value sin_approx of the sine approximation function depending on the time stamp tn.

Moreover, the convolution coefficient generation unit 123 includes a comparator 221 as a configuration for outputting the enable signal.

A count number cycle corresponding to the flicker cycle is input to the counter 201, and when the counter 201 counts a count value cnt from 0 to the count number cycle, the counter 201 resets the count value cnt and repeats processing of counting from 0 again. The count value cnt is supplied to the comparators 202, 203, 211, 212, and 221.

A set value cos_ptim is supplied to the comparator 202, and the comparator 202 compares the count value cnt supplied from the counter 201 with the set value cos_ptim, and outputs +1 to the selector 204 at a timing when the count value cnt matches the set value cos_ptim. For the count value cnt other than the set value cos_ptim, for example, 0 is output.

A set value cos_ntim is supplied to the comparator 203, and the comparator 203 compares the count value cnt supplied from the counter 201 with the set value cos_ntim, and outputs −1 to the selector 204 at a timing when the count value cnt matches the set value cos_ntim. For the count value cnt other than the set value cos_ntim, for example, 0 is output.

The selector 204 selects and outputs +1 to the flip-flop 205 at a timing when +1 is supplied from the comparator 202, selects and outputs −1 to the flip-flop 205 at a timing when −1 is supplied from the comparator 202, and outputs a value fed back from the flip-flop 205 to the flip-flop 205 at other timings.

The flip-flop 205 holds and outputs the value (+1 or −1) input from the selector 204 until the value is updated next time. The value output from the flip-flop 205 is the function value cos_approx of the cosine approximation function.

A set value sin_ptim is supplied to the comparator 211, and the comparator 211 compares the count value cnt supplied from the counter 201 with the set value sin_ptim, and outputs +1 to the selector 213 at a timing when the count value cnt matches the set value sin_ptim. For the count value cnt other than the set value sin_ptim, for example, 0 is output.

A set value sin_ntim is supplied to the comparator 212, and the comparator 212 compares the count value cnt supplied from the counter 201 with the set value sin_ntim, and outputs −1 to the selector 213 at a timing when the count value cnt matches the set value sin_ntim. For the count value cnt other than the set value sin_ntim, for example, 0 is output.

The selector 213 selects and outputs +1 to the flip-flop 214 at a timing when +1 is supplied from the comparator 211, selects and outputs −1 to the flip-flop 214 at a timing when −1 is supplied from the comparator 212, and outputs a value fed back from the flip-flop 214 to the flip-flop 214 at other timings.

The flip-flop 214 holds and outputs the value (+1 or −1) input from the selector 213 until the value is updated next time. The value output from the flip-flop 214 is the function value sin_approx of the sine approximation function.

A set value (cycle-1) is supplied to the comparator 221, and the comparator 221 compares the count value cnt supplied from the counter 201 with the set value (cycle-1), and sets the enable signal to High at a timing when the count value cnt matches the set value (cycle-1). At the count value cnt other than the set value (cycle-1), the enable signal of Low is output.

Figure 12:
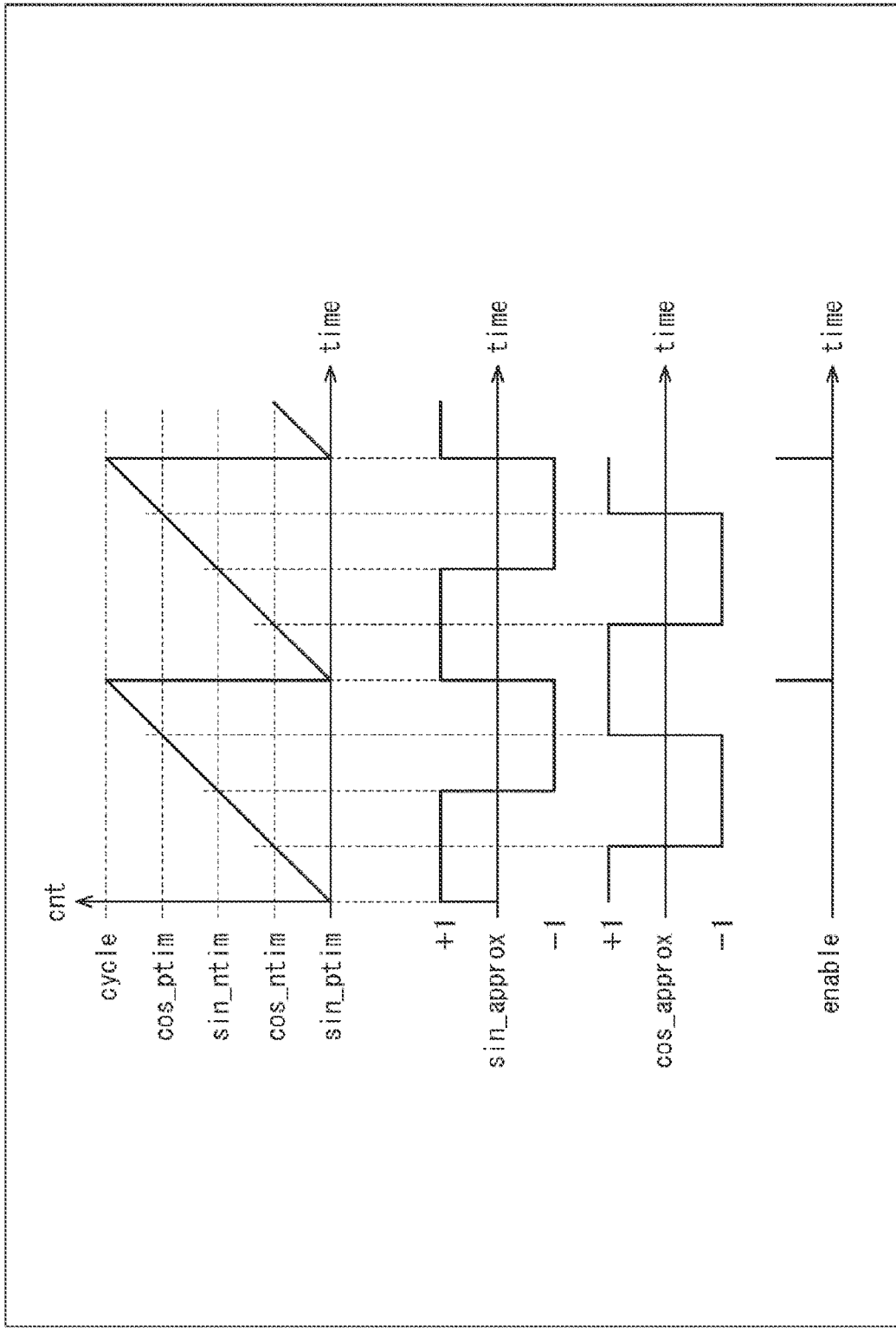
FIG. 12 is a diagram illustrating a timing chart in a case where operation is performed by a logic circuit illustrated in FIG. 11.

FIG. 12 illustrates a timing chart in a case where operation is performed by the logic circuit illustrated in FIG. 11.

The sine approximation function sin_approx(t) and the cosine approximation function cos_approx(t) illustrated in FIG. 10 are implemented by the logic circuit in FIG. 11.

The enable signal is High in a frame cycle, specifically, in units of 10 msec in a case where flicker occurring under the light source having the power supply frequency of 50 Hz is detected.

5. Third Configuration Example of Flicker Detection Unit

Figure 13:
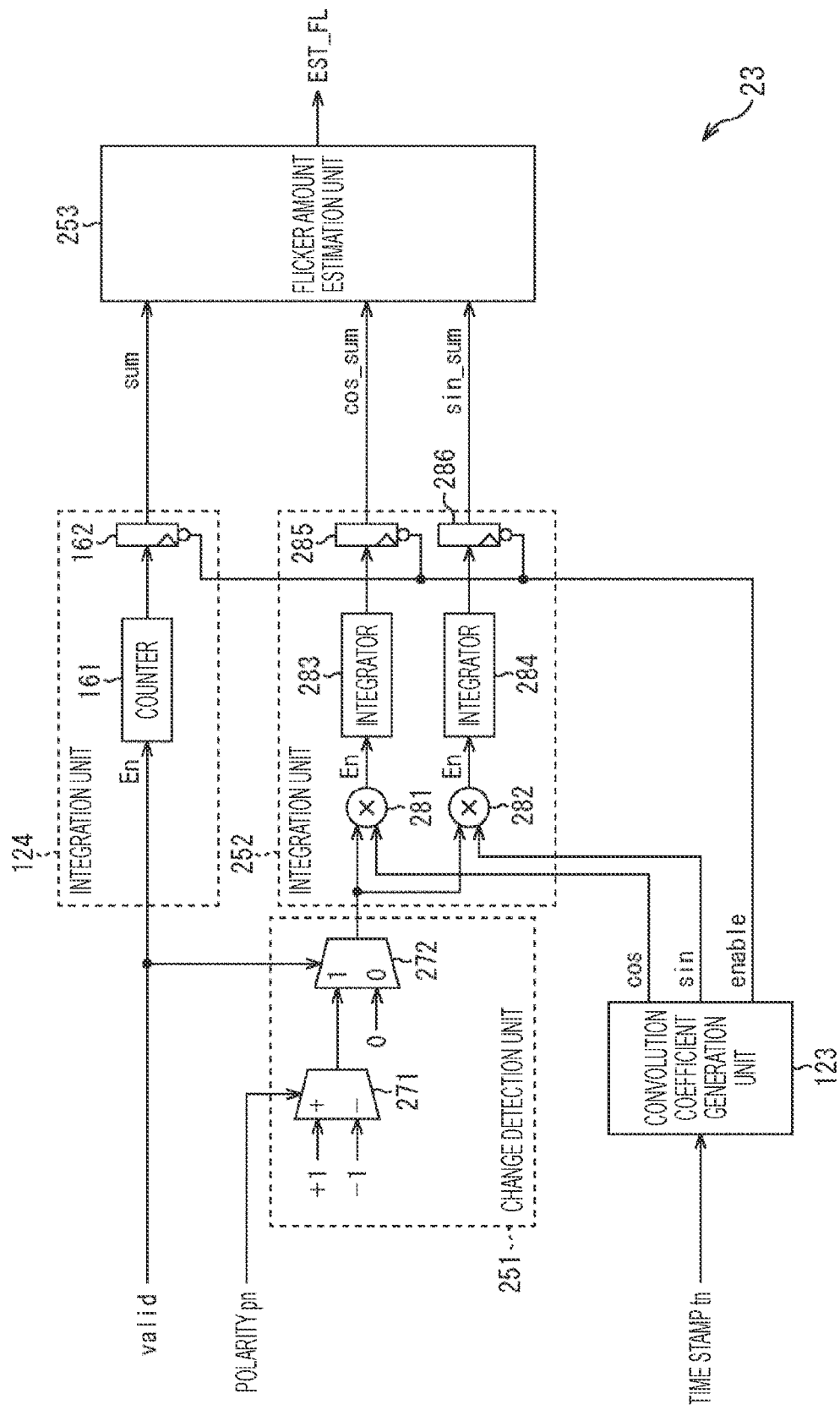
FIG. 13 is a block diagram illustrating a third configuration example of the flicker detection unit.

FIG. 13 is a block diagram illustrating a third configuration example of the flicker detection unit 23.

Note that, in FIG. 13, portions corresponding to the configuration of the flicker detection unit 23 according to the second configuration example illustrated in FIG. 9 are denoted by the same reference numerals, and the description thereof will be omitted as appropriate.

The flicker detection unit 23 in FIG. 13 includes the convolution coefficient generation unit 123, a change detection unit 251, integration units 124 and 252, and a flicker amount estimation unit 253.

The convolution coefficient generation unit 123 and the integration unit 124 are the same as the configuration of the flicker detection unit 23 according to the second configuration example illustrated in FIG. 9, and the change detection unit 251, the integration unit 252, and the flicker amount estimation unit 253 are provided instead of the + change detection unit 121, the − change detection unit 122, the integration units 125 and 126, and the flicker amount estimation unit 127 in FIG. 9.

In the second configuration example illustrated in FIG. 9, results of multiplication of the polarity of the event and the function values of the sine approximation function and the cosine approximation function are individually integrated in the positive polarity and the negative polarity, and then subtraction is performed in the flicker amount estimation unit 127.

On the other hand, in the third configuration example in FIG. 13, results of multiplication of the polarity of the event and the function values of the sine approximation function and the cosine approximation function are subjected to addition and subtraction depending on the polarity, and then integrated.

The change detection unit 251 includes selectors 271 and 272.

The selector 271 selects and outputs +1 or −1 to the selector 272 at a timing when the polarity pn of the event is supplied from the event output unit 22.

Specifically, in a case where +1 representing the positive polarity is supplied as the polarity pn of the event, the selector 271 selects and outputs +1 to the selector 272, and in a case where −1 representing the negative polarity is supplied as the polarity pn of the event, the selector 271 selects and outputs −1 to the selector 272.

The selector 272 selects and outputs an output (+1 or −1) of the selector 271 to the integration unit 252 at a timing when the valid signal of High indicating occurrence of an event is supplied, and selects and outputs 0 to the integration unit 252 at other timings. Thus, the selector 272 outputs any of +1, −1, or 0 to the integration unit 252.

The integration unit 252 includes multipliers 281 and 282, integrators 283 and 284, and output units 285 and 286.

The multiplier 281 supplies, to the integrator 283, a multiplication result obtained by multiplying an output (any of +1, −1, or 0) of the selector 272 of the change detection unit 251 by the function value of the cosine approximation function supplied from the convolution coefficient generation unit 123. In a case where the output of the selector 272 is 0, there is no influence on multiplication, and thus the multiplier 281 supplies, to the integrator 283, a multiplication result obtained by multiplying +1 or −1 by the function value of the cosine approximation function.

The multiplier 282 supplies, to the integrator 284, a multiplication result obtained by multiplying the output (any of +1, −1, or 0) of the selector 272 of the change detection unit 251 by the function value of the sine approximation function supplied from the convolution coefficient generation unit 123. In a case where the output of the selector 272 is 0, there is no influence on multiplication, and thus the multiplier 282 supplies, to the integrator 284, a multiplication result obtained by multiplying +1 or −1 by the function value of the sine approximation function.

The integrator 283 integrates the multiplication result supplied from the multiplier 281 and supplies the integrated multiplication result to the output unit 285. The integrator 284 integrates the multiplication result supplied from the multiplier 282 and supplies the integrated multiplication result to the output unit 286.

The output unit 285 includes, for example, a flip-flop, acquires an integral value cos_sum of the integrator 283 at the timing when the enable signal supplied from the convolution coefficient generation unit 123 is turned on, and supplies the integral value cos_sum to the flicker amount estimation unit 253.

The output unit 286 includes, for example, a flip-flop, acquires an integral value sin_sum of the integrator 284 at the timing when the enable signal supplied from the convolution coefficient generation unit 123 is turned on, and supplies the integral value sin_sum to the flicker amount estimation unit 253.

The flicker amount estimation unit 253 calculates the amplitude component of the flicker frequency by using the integration results supplied from the output units 162, 285, and 286, and estimates the flicker amount (flicker likeness).

Specifically, the flicker amount estimation unit 253 calculates the flicker amount EST_FL by Formula (10) or Formula (11) using the number of events sum, and the integral value cos_sum and sin_sum.

[Expression 3]

$$EST\_FL=(|sin\_sum|+|cos\_sum|)/sum \quad (10)$$

$$EST\_FL=\sqrt{(|sin\_sum|^2+|cos\_sum|^2)}/sum \quad (11)$$

Also in Formula (10) and Formula (11), the flicker amount EST_FL is a small value in a case where the flicker of the target cycle does not occur, and the flicker amount EST_FL is a large value in a case where the flicker of the target cycle occurs.

In the third configuration example in FIG. 13, instead of individually integrating the positive polarity and the negative polarity and then performing subtraction as in the second configuration example in FIG. 9, addition and subtraction are performed depending on the positive polarity and the negative polarity and then integration is performed, whereby an integration unit including the multipliers and the integrators can be implemented with a 1/2 configuration, and operation can be performed lighter.

6. Processing Flow of Flicker Control Process

Figure 14:
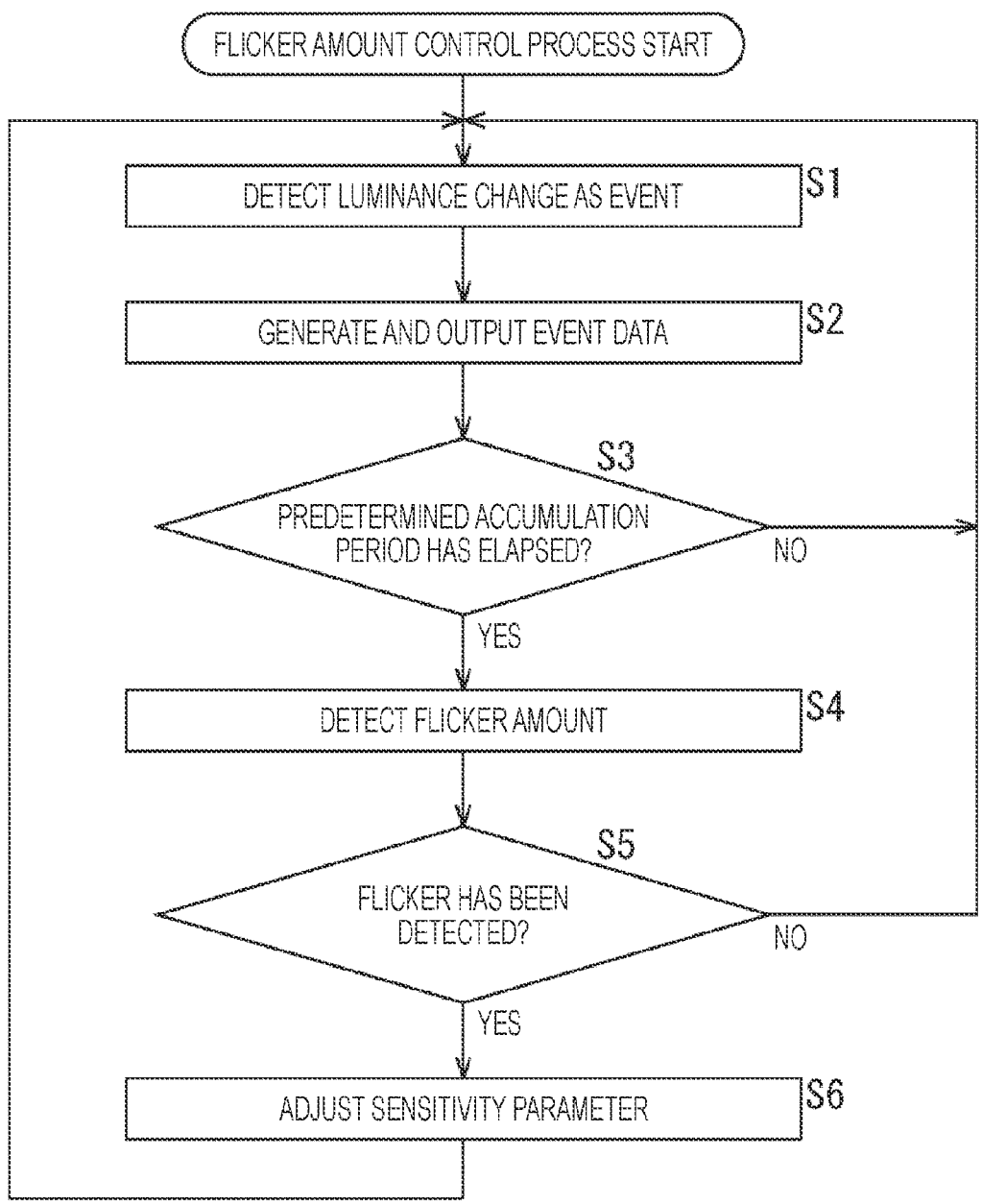
FIG. 14 is a flowchart explaining a flicker control process by the DVS in FIG. 1.

A flicker control process by the DVS 1 will be described with reference to a flowchart in FIG. 14. This process is started, for example, when the DVS 1 is instructed to start event detection (imaging).

First, in step S1, the pixel array unit 11 detects a luminance change as an event. In a case where an event is detected, an event flag is supplied from the pixel circuit 21 that has detected the event to the event output unit 22.

In step S2, the event output unit 22 acquires the event flag from the pixel circuit 21, generates event data, and outputs the event data to the outside of the DVS 1 and the flicker detection unit 23. Specifically, the event output unit 22 adds, as the event data, the coordinates (xn, yn) of the pixel circuit 21 that is position information of the event, and the time stamp tn that is time information of the event, to the polarity pn of the event corresponding to the event flag, sets the valid signal that is the output flag to High, and outputs the event data to the outside of the DVS 1 and the flicker detection unit 23.

In step S3, the flicker detection unit 23 determines whether or not a predetermined accumulation period has elapsed. The predetermined accumulation period is a period (cycle) in which the convolution coefficient generation unit 123 sets the enable signal to High, and can be, for example, the same as the flicker cycle, or a period of an integer multiple of the flicker cycle.

Processing of steps S1 to S3 is repeated until it is determined in step S3 that the predetermined accumulation period has elapsed. As a result, the number of events and the integral value are updated depending on occurrence of the event data. Then, in a case where it is determined in step S3 that the predetermined accumulation period has elapsed, the process proceeds to step S4.

In step S4, the flicker detection unit 23 detects (estimates) the flicker amount by using the event data supplied from the event output unit 22 in the predetermined accumulation period, and outputs the flicker amount to the outside of the DVS 1 and the pixel parameter control unit 24. The flicker amount is calculated by the flicker amount EST_FL of Formula (6) or Formula (7) or the flicker amount EST_FL of Formula (10) or Formula (11).

In step S5, the pixel parameter control unit 24 determines whether or not the flicker has been detected on the basis of the flicker amount supplied from the flicker detection unit 23. For example, in a case where the calculated flicker amount EST_FL is greater than or equal to a predetermined threshold value, the pixel parameter control unit 24 determines that flicker has been detected.

In a case where it is determined in step S5 that no flicker has been detected, the process returns to step S1, and processing of steps S1 to S5 described above is repeated.

On the other hand, in a case where it is determined in step S5 that the flicker has been detected, the process proceeds to step S6, and the pixel parameter control unit 24 adjusts (controls) the sensitivity parameter of the pixel circuit 21 on the basis of the detected flicker amount. For example, the pixel parameter control unit 24 changes the threshold values (voltages)+Vth and −Vth of the output unit 43 of the pixel circuit 21.

Thereafter, the process returns to step S1, and the above-described processing is repeated.

Figure 15:
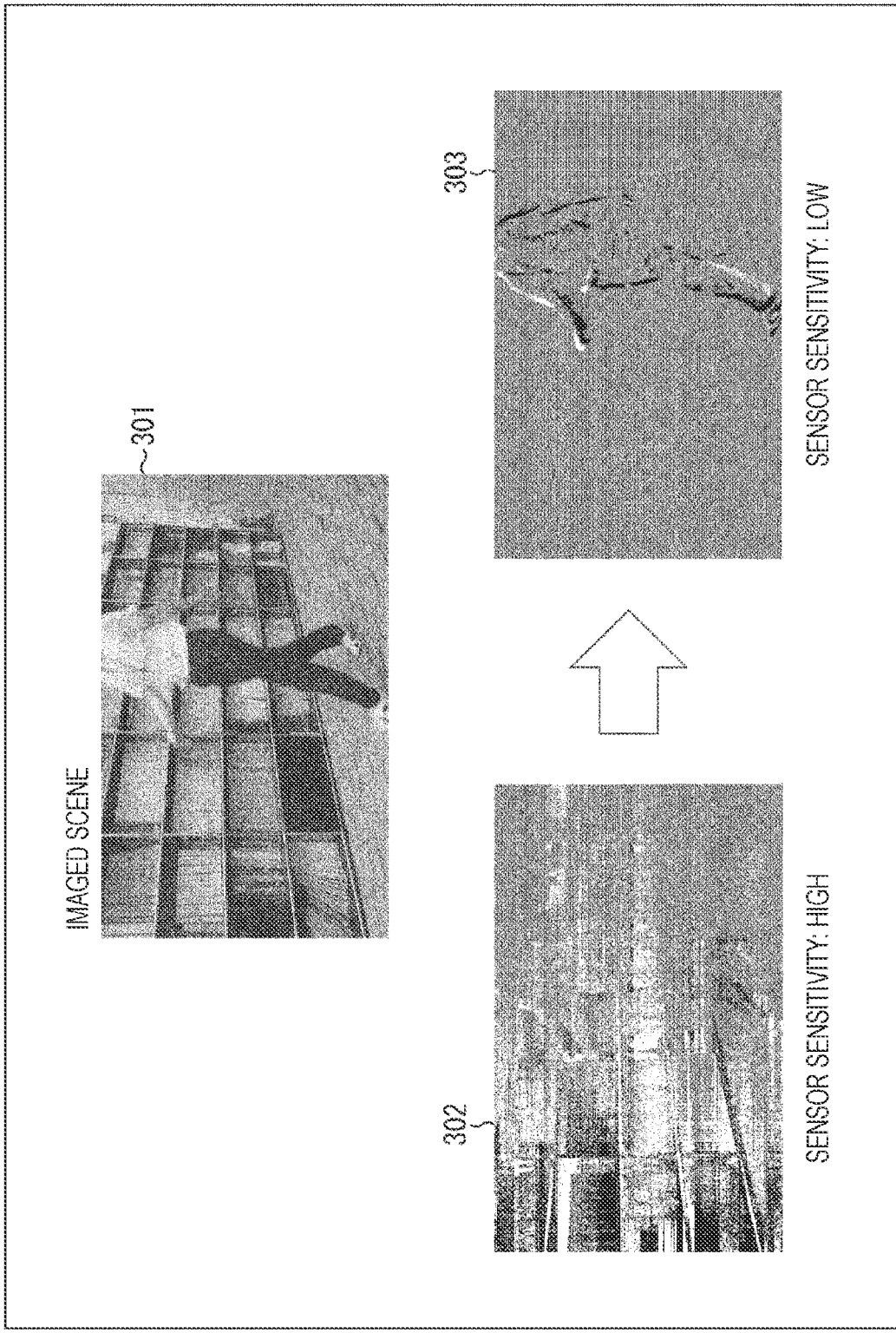
FIG. 15 is a diagram illustrating a processing result of the flicker control process.

FIG. 15 illustrates an example of a processing result of the flicker control process by the DVS 1.

In an imaged scene indicated by an image 301 in FIG. 15, event detection by the DVS 1 is executed under an environment using the light source having the power supply frequency of 50 Hz. The imaged scene shows a state in which a person moves walking in front of a background from right to left in a screen. The image 301 is an image captured by a general CMOS image sensor.

An image 302 is frame data (frame image) of the event detection by the DVS 1. The image 302 is in a state where the sensitivity of the DVS 1 as an event detection sensor is high, events are detected in the entire screen, and an event in which a moving person is detected is buried in noise.

An image 303 is frame data (frame image) of the event detection after the sensor sensitivity is lowered compared to the image 302 by the flicker control process.

In the image 303, the noise capturing the flicker is reduced, and only movement larger than the flicker (mainly moving person) is detected as an event.

Thus, according to the flicker control process, the flicker amount (flicker information) can be detected from the output indicating the luminance change. Then, in a case where the flicker amount is large, the flicker can be suppressed, and only a superior event can be extracted.

Note that, in the flicker amount control process described above, only processing of lowering the sensitivity has been described; however, even in a case where the sensor sensitivity is too low, it is also possible to perform control such that the sensor sensitivity is increased (the threshold value of the luminance change is lowered) to detect a more minute event.

7. Fourth Configuration Example of Flicker Detection Unit

Next, a fourth configuration example of the flicker detection unit 23 will be described.

Figure 16:
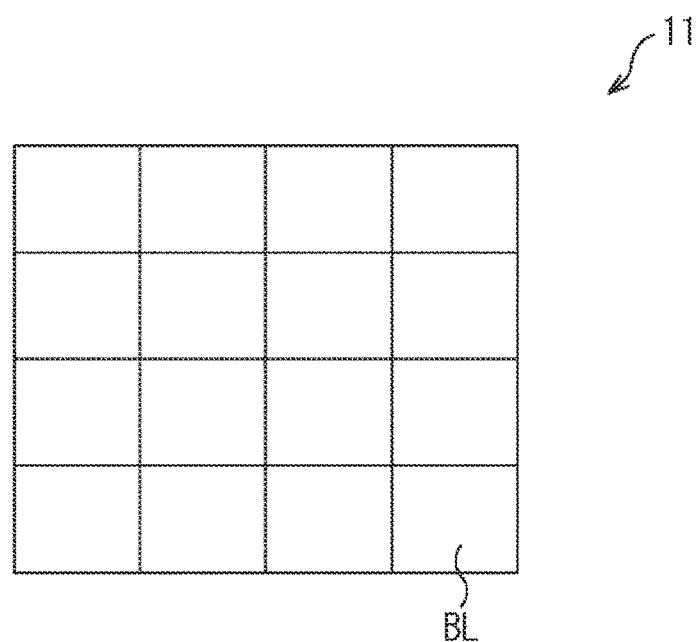
FIG. 16 is a diagram illustrating blocks obtained by dividing a pixel array unit.

In the next fourth configuration example, as illustrated in FIG. 16, the plurality of pixel circuits 21 of the entire pixel array unit 11 is divided into M (M >1) blocks BL, and the flicker amount is detected for each block BL. The example in FIG. 16 illustrates an example of M=16, that is, in which the plurality of pixel circuits 21 of the entire pixel array unit 11 is divided into 16 blocks BL of 4×4. Note that the number of divisions in the vertical direction and the number of divisions in the horizontal direction are not necessarily the same.

Figure 17:
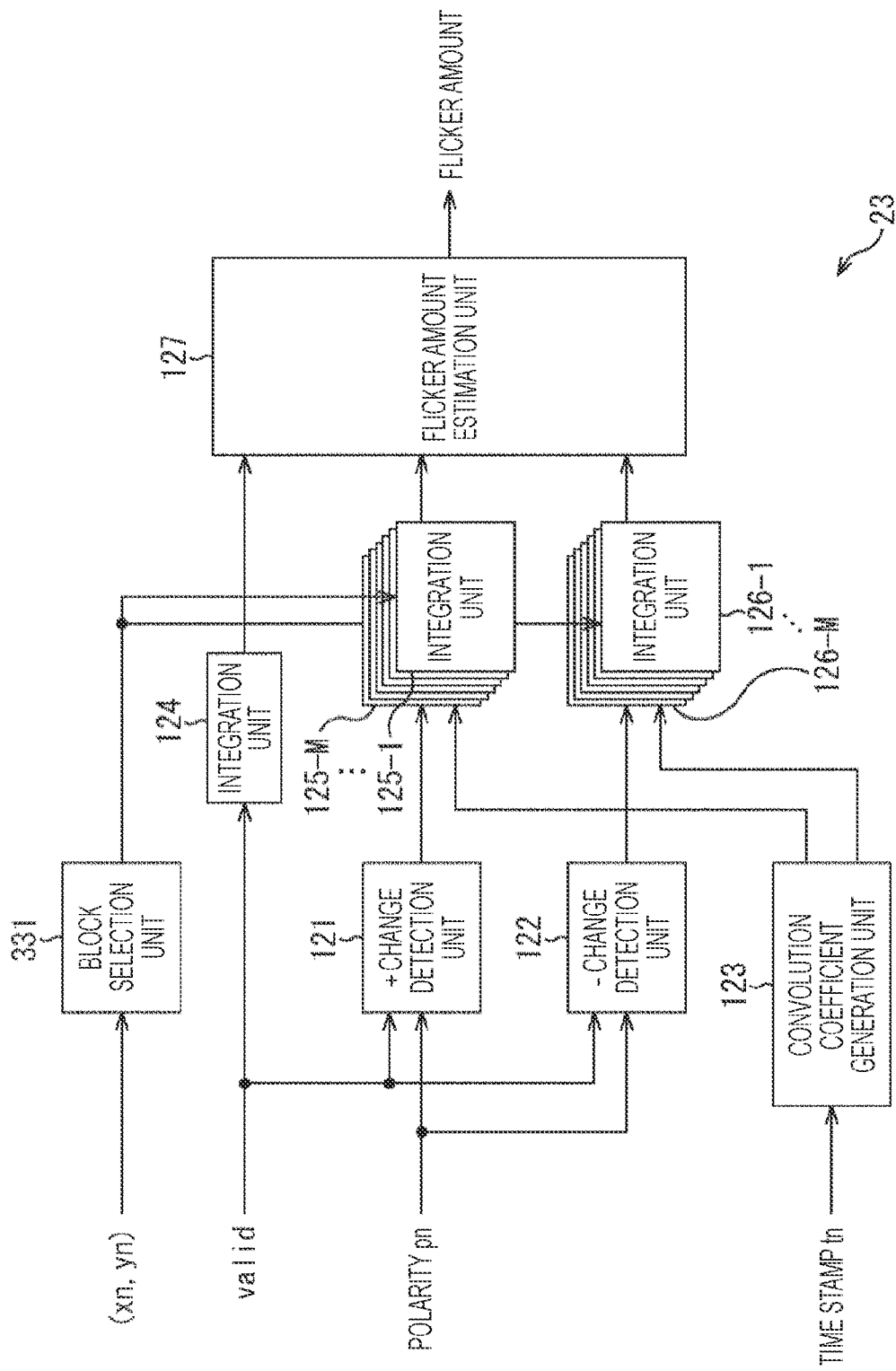
FIG. 17 is a block diagram illustrating a fourth configuration example of the flicker detection unit.

FIG. 17 is a block diagram illustrating a configuration example of the flicker detection unit 23 according to the fourth configuration example.

In FIG. 17, portions corresponding to those of the second configuration example in FIG. 8 are denoted by the same reference numerals, and the description thereof will be omitted as appropriate.

The fourth configuration example in FIG. 17 is different from the second configuration example in FIG. 8 in that the integration units 125 and 126 are provided in the same number as the number of the divided blocks BL (that is, M) and that a block selection unit 331 is newly provided.

The block selection unit 331 is supplied with coordinates (xn, yn) that are position information of the event data supplied from the event output unit 22. The block selection unit 331 selects an integration unit 125-m (m is any one of 1 to M) corresponding to a position (block BL) where the event occurs, from among integration units 125-1 to 125-M. Similarly, for integration units 126-1 to 126-M, the block selection unit 331 selects an integration unit 126-m corresponding to the position (block BL) where the event occurs, from among the integration units 126-1 to 126-M.

A positive event detection result detected by the + change detection unit 121 is supplied to the selected integration unit 125-m. A negative event detection result detected by the − change detection unit 122 is supplied to the selected integration unit 126-m.

Operation of each of the integration units 125-1 to 125-M and the integration units 126-1 to 126-M is similar to that of the integration unit 125 in FIGS. 8 and 9. Thus, in the fourth configuration example, the integral values cos_pos, sin_pos, cos_neg, and sin_neg in FIG. 9 are calculated in units of blocks BL.

The flicker amount estimation unit 127 calculates the flicker amount EST_FL in units of blocks BL.

According to the flicker detection unit 23 according to the fourth configuration example described above, the flicker amount can be estimated in units of blocks BL.

The pixel parameter control unit 24 adjusts (controls) the sensitivity parameter of the pixel circuit 21 in units of blocks BL.

Furthermore, since the flicker often occurs in a wide region in the pixel array unit 11 as a whole, the pixel parameter control unit 24 can perform control to lower the sensitivity of event detection in a case where the flicker occurs in the entire screen, and not to change the sensitivity of event detection in a case where the flicker is intensively detected in a part of the blocks BL.

Alternatively, even in a case where the pixel parameter control unit 24 changes the sensitivity parameter on the entire screen, it is possible to perform control such that the sensitivity parameter is changed depending on the flicker amount of the block BL in which the flicker amount is in a predetermined order among the plurality of blocks BL. For example, it is possible to perform control to change the sensitivity parameter on the basis of the flicker amount of the block BL having the second smallest flicker amount.

8. Another Configuration Example of DVS

Figure 18:
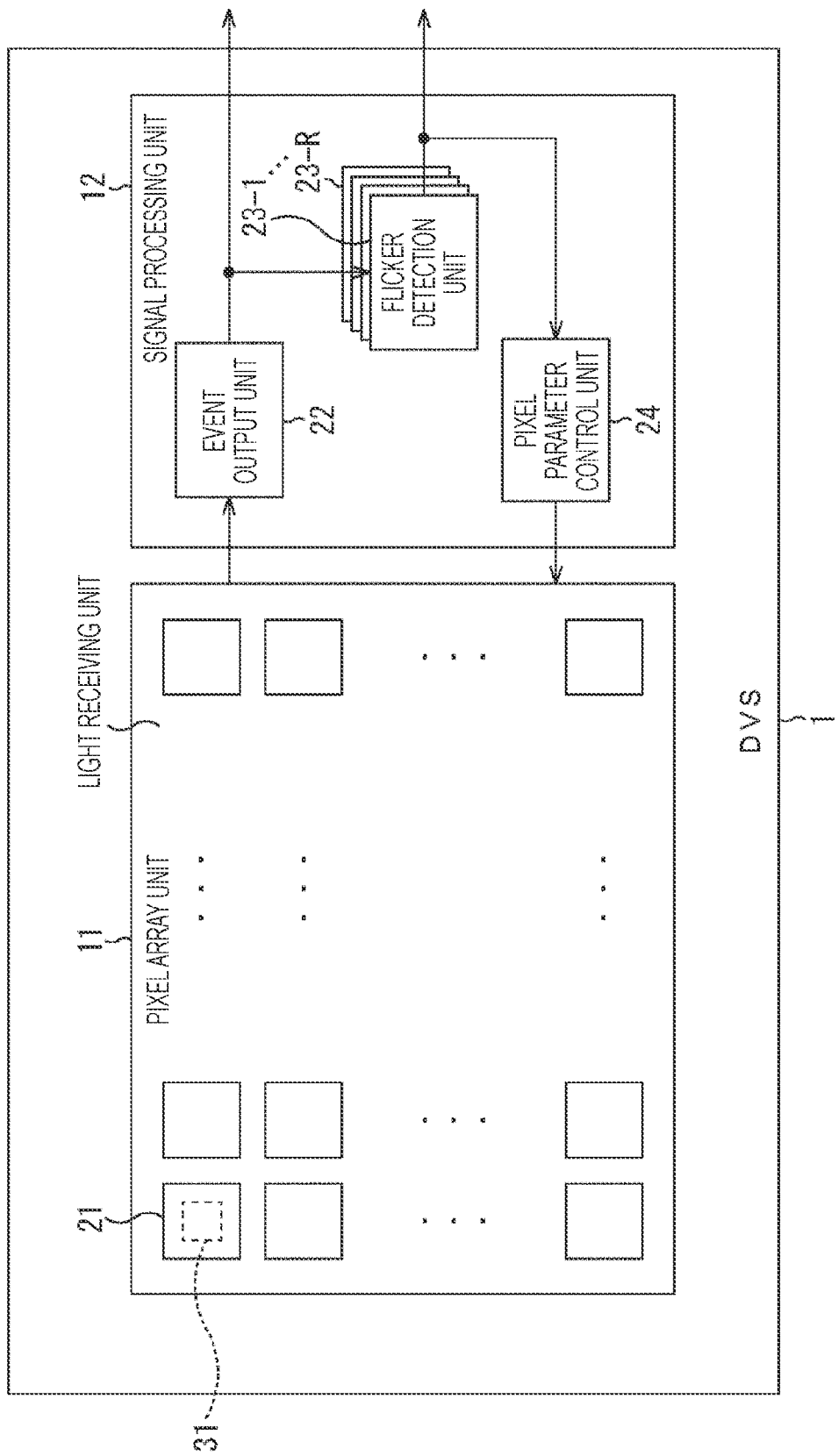
FIG. 18 is a block diagram illustrating another configuration example of the DVS.

FIG. 18 is a block diagram illustrating another configuration example of the DVS 1.

In FIG. 18, portions corresponding to those in FIG. 1 are denoted by the same reference numerals, and the description thereof will be omitted as appropriate.

In FIG. 18, the DVS 1 is provided with flicker detection units 23-1 to 23-R (R >1), and is different from the DVS 1 in FIG. 1 in that a plurality of (R) the flicker detection units 23 is provided, and is the same as the DVS 1 in FIG. 1 in other points.

The DVS 1 in FIG. 18 can detect a plurality of flicker frequencies by including the plurality of flicker detection units 23-1 to 23-R. That is, the flicker detection units 23-1 to 23-R respectively have different flicker frequencies set as detection targets.

For example, when R=2 is set and the flicker frequencies detected by the flicker detection units 23-1 and 23-2 are set to 100 Hz and 120 Hz, it is possible to detect flickers corresponding to the western Japan area and the eastern Japan area.

Alternatively, when the frequencies of flickers detected by the flicker detection units 23-1 to 23-R are set to 25 Hz, 50 hz, 100 Hz, 200 Hz, 400 Hz, . . . , only events of arbitrary frequencies can be detected, and frequency analysis including flickers becomes possible.

9. Chip Configuration Examples of DVS

Figure 19:
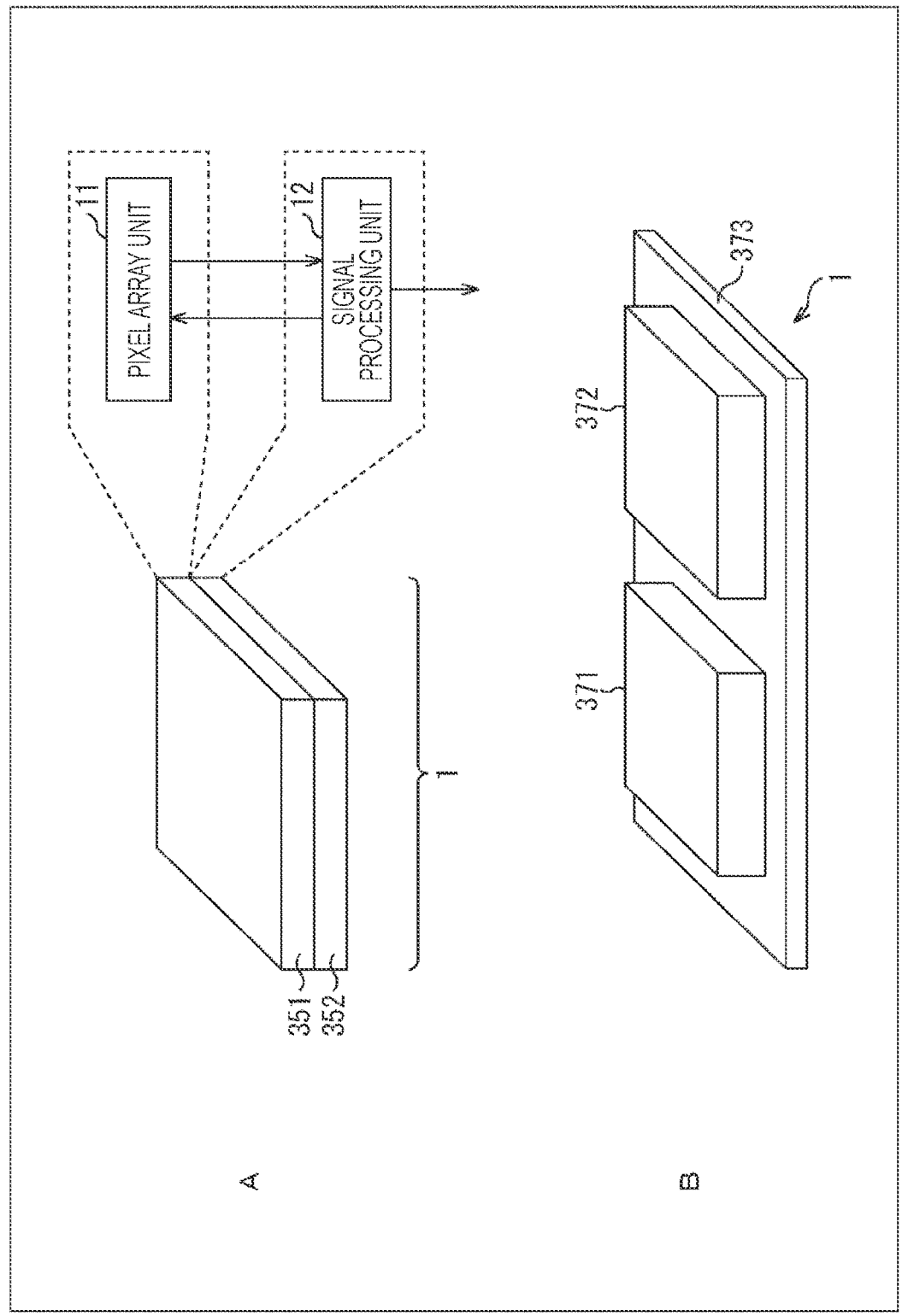
FIG. 19 is a perspective view illustrating a chip configuration example of the DVS.

FIG. 19 is a perspective view illustrating a chip configuration example of the DVS 1.

For example, as illustrated in A of FIG. 19, the DVS 1 can include one chip in which a first die (substrate) 351 and a second die (substrate) 352 are stacked.

The first die 351 includes (a circuit as) the pixel array unit 11, and the second die 352 includes a logic circuit including the signal processing unit 12.

Note that, the DVS 1 may include three layers in which another logic die is stacked in addition to the first die 351 and the second die 352. Alternatively, four or more layers of dies (substrates) may be stacked.

Alternatively, as illustrated in B of FIG. 19, the DVS 1 can include a first chip 371 and a second chip 372 formed on a relay substrate (interposer substrate) 373. For example, the first chip 371 may include (a circuit as) the pixel array unit 11, and the second chip 372 may include the signal processing unit 12.

Note that the first chip 371 and the second chip 372 may be separated from each other without being integrated together by using the relay substrate 373 as in B of FIG. 19.

As described above, according to the DVS 1 to which the present technology is applied, the flicker information can be detected from an output of the DVS 1.

Furthermore, in a case where the second to fourth configuration examples of the flicker detection unit 23 are adopted, detection of the flicker can be achieved with a smaller memory capacity than in a case where the first configuration example of the flicker detection unit 23 is adopted.

The embodiment of the present technology is not limited to the embodiments described above, and various modifications are possible without departing from the gist of the present technology.

For example, a mode can be adopted in which some or all of the above-described plurality of configuration examples described above are combined.

Furthermore, each step described in the above flowchart can be executed by sharing in a plurality of devices, other than being executed by one device.

Moreover, in a case where a plurality of pieces of processing is included in one step, the plurality of pieces of processing included in the one step can be executed by sharing in a plurality of devices, other than being executed by one device.

Note that, the effects described in the present specification are merely examples and are not limited, and may have effects other than those described in the present specification.

Note that, the present technology can have the following configurations.

(1)

A signal processing device including:
a change detection unit that detects a first luminance change in a positive direction and a second luminance change in a negative direction among luminance changes detected by a light receiving unit;
a coefficient generation unit that generates a coefficient depending on a time at which the luminance change is detected; and
an integration unit that integrates a result of multiplication of the first luminance change and the coefficient and integrates a result of multiplication of the second luminance change and the coefficient.

(2)

The signal processing device according to (1), in which the change detection unit outputs the first luminance change with a first value and outputs the second luminance change with a second value.

(3)

The signal processing device according to (1), in which the change detection unit
includes:
a first change detection unit that detects the first luminance change; and
a second change detection unit that detects the second luminance change.

(4)

The signal processing device according to (3), in which the first change detection unit and the second change detection unit represent the first luminance change or the second luminance change as an ON-OFF signal.

(5)

The signal processing device according to any of (1) to (4), in which
the coefficient generation unit generates, as the coefficients, values of a sine function and a cosine function depending on the time.

(6)

The signal processing device according to (5), in which the coefficient generation unit generates, as the coefficients, values of the sine function and the cosine function depending on a cycle desired to be detected.

(7)

The signal processing device according to (5) or (6), in which
the coefficient generation unit generates, as the coefficients, values of a sine approximation function and a cosine approximation function approximating the sine function and the cosine function.

(8)

The signal processing device according to (7), in which the sine approximation function and the cosine approximation function are functions obtained by approximating the sine function and the cosine function to signals having two values of 1 and −1.

(9)

The signal processing device according to (8), in which the coefficient generation unit outputs 1 or -1 on the basis of a table in which 1 or -1 is associated with the time.

(10)

The signal processing device according to any of (1) to (9), further including
a flicker amount estimation unit that estimates a flicker amount in which the luminance change occurs at a specific frequency on the basis of an integration result by the integration unit.

(11)

The signal processing device according to (10), further including
a plurality of flicker detection units including:
the change detection unit;
the coefficient generation unit;
the integration unit; and
the flicker amount estimation unit, in which
the plurality of flicker detection units respectively has different frequencies at which the flicker amount is estimated.

(12)

The signal processing device according to (10) or (11), further including
a control unit that controls a sensitivity parameter of the light receiving unit on the basis of an estimation result by the flicker amount estimation unit.

(13)

The signal processing device according to any of (1) to (12), in which
the light receiving unit is divided into a plurality of blocks,
a plurality of the integration units is included corresponding to the plurality of blocks, and
the plurality of the integration units integrates the result of multiplication in units of blocks in which the luminance change occurs.

(14)

A signal processing method including
detecting a first luminance change in a positive direction and a second luminance change in a negative direction among luminance changes detected by a light receiving unit,
generating a coefficient depending on a time at which the luminance change is detected, and integrating a result of multiplication of the first luminance change and the coefficient and integrating a result of multiplication of the second luminance change and the coefficient, by a signal processing device.

(15)

A detection sensor including:

a light receiving unit in which pixels that perform photoelectric conversion of incident light to generate electric signals are arranged in a lattice;

a change detection unit that detects a first luminance change in a positive direction and a second luminance change in a negative direction among luminance changes detected by the light receiving unit;

a coefficient generation unit that generates a coefficient depending on a time at which the luminance change is detected; and an integration unit that integrates a result of multiplication of the first luminance change and the coefficient and integrates a result of multiplication of the second luminance change and the coefficient.

REFERENCE SIGNS LIST

1 DVS
11 Pixel array unit
12 Signal processing unit
21 Pixel circuit
22 Event output unit
23 Flicker detection unit
24 Pixel parameter control unit
31 Pixel
32 Event detection unit
121 + change detection unit
122 − change detection unit
123 Convolution coefficient generation unit
124 to 126 Integration unit
127 Flicker amount estimation unit
251 Change detection unit
252 Integration unit
253 Flicker amount estimation unit
331 Block selection unit

The invention claimed is:

1. A signal processing device comprising:
a change detection unit that detects a first luminance change in a positive direction and a second luminance change in a negative direction among luminance changes detected by a light receiving unit;
a coefficient generation unit that generates a coefficient depending on a time at which the luminance change is detected; and
an integration unit that integrates a result of multiplication of the first luminance change and the coefficient and integrates a result of multiplication of the second luminance change and the coefficient,
wherein the change detection unit, the coefficient generation unit, and the integration unit are each implemented via at least one processor.

2. The signal processing device according to claim 1, wherein
the change detection unit outputs the first luminance change with a first value and outputs the second luminance change with a second value.

3. The signal processing device according to claim 1, wherein
the change detection unit includes:
a first change detection unit that detects the first luminance change; and
a second change detection unit that detects the second luminance change, and
the first change detection unit and the second change detection unit are each implemented via at least one processor.

4. The signal processing device according to claim 3, wherein
the first change detection unit and the second change detection unit represent the first luminance change or the second luminance change as an ON-OFF signal.

5. The signal processing device according to claim 1, wherein
the coefficient generation unit generates, as the coefficients, values of a sine function and a cosine function depending on the time.

6. The signal processing device according to claim 5, wherein
the coefficient generation unit generates, as the coefficients, values of the sine function and the cosine function depending on a cycle desired to be detected.

7. The signal processing device according to claim 5, wherein
the coefficient generation unit generates, as the coefficients, values of a sine approximation function and a cosine approximation function approximating the sine function and the cosine function.

8. The signal processing device according to claim 7, wherein
the sine approximation function and the cosine approximation function are functions obtained by approximating the sine function and the cosine function to signals having two values of 1 and −1.

9. The signal processing device according to claim 8, wherein
the coefficient generation unit outputs 1 or −1 on a basis of a table in which 1 or −1 is associated with the time.

10. The signal processing device according to claim 1, further comprising
a flicker amount estimation unit that estimates a flicker amount in which the luminance change occurs at a specific frequency on a basis of an integration result by the integration unit,
wherein the flicker amount estimation unit is implemented via at least one processor.

11. The signal processing device according to claim 10, further comprising
a plurality of flicker detection units including:
the change detection unit;
the coefficient generation unit;
the integration unit; and
the flicker amount estimation unit,
wherein the plurality of flicker detection units respectively has different frequencies at which the flicker amount is estimated, and
wherein the plurality of flicker detection units respectively is implemented via at least one processor.

12. The signal processing device according to claim 10, further comprising
a control unit that controls a sensitivity parameter of the light receiving unit on a basis of an estimation result by the flicker amount estimation unit, wherein the control unit is implemented via at least one processor.

13. The signal processing device according to claim 1, wherein
the light receiving unit is divided into a plurality of blocks,
a plurality of the integration units is included corresponding to the plurality of blocks, and
the plurality of the integration units integrates the result of multiplication in units of blocks in which the luminance change occurs,
wherein the plurality of integration units respectively is implemented via at least one processor.

14. A signal processing method comprising
detecting a first luminance change in a positive direction and a second luminance change in a negative direction among luminance changes detected by a light receiving unit,
generating a coefficient depending on a time at which the luminance change is detected, and
integrating a result of multiplication of the first luminance change and the coefficient and integrating a result of multiplication of the second luminance change and the coefficient,
by a signal processing device.

15. A detection sensor comprising:
a light receiving unit in which pixels that perform photoelectric conversion of incident light to generate electric signals are arranged in a lattice;
a change detection unit that detects a first luminance change in a positive direction and a second luminance change in a negative direction among luminance changes detected by the light receiving unit;
a coefficient generation unit that generates a coefficient depending on a time at which the luminance change is detected; and
an integration unit that integrates a result of multiplication of the first luminance change and the coefficient and integrates a result of multiplication of the second luminance change and the coefficient,
wherein the light receiving unit, the change detection unit, the coefficient generation unit, and the integration unit are each implemented via at least one processor.

* * * * *